(12) United States Patent
Yamamoto

(10) Patent No.: US 12,142,138 B2
(45) Date of Patent: Nov. 12, 2024

(54) OBJECT DETECTION SYSTEM, INFORMATION PROCESSING APPARATUS, AND INFORMATION PROCESSING METHOD

(71) Applicant: SONY GROUP CORPORATION, Tokyo (JP)

(72) Inventor: Keitaro Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 1 day.

(21) Appl. No.: 17/905,834

(22) PCT Filed: Feb. 25, 2021

(86) PCT No.: PCT/JP2021/007093
§ 371 (c)(1),
(2) Date: Sep. 8, 2022

(87) PCT Pub. No.: WO2021/187039
PCT Pub. Date: Sep. 23, 2021

(65) Prior Publication Data
US 2023/0121146 A1    Apr. 20, 2023

(30) Foreign Application Priority Data
Mar. 17, 2020    (JP) .................... 2020-046726

(51) Int. Cl.
G08G 1/005    (2006.01)
G06V 10/98    (2022.01)
G06V 20/58    (2022.01)
G08G 1/16     (2006.01)

(52) U.S. Cl.
CPC ............. *G08G 1/005* (2013.01); *G06V 10/98* (2022.01); *G06V 20/58* (2022.01); *G08G 1/166* (2013.01)

(58) Field of Classification Search
CPC ................. G06V 10/98; G06V 20/58
See application file for complete search history.

(56) References Cited

U.S. PATENT DOCUMENTS

2013/0170706 A1\*  7/2013  Mori ................. G06V 20/56
                                                    382/103
2018/0253611 A1\*  9/2018  Kunichika ............. B60K 35/00

FOREIGN PATENT DOCUMENTS

| JP | 2014-153875 A | 8/2014 |
|---|---|---|
| JP | 2016-139392 A | 8/2016 |
| JP | 2019-021433 A | 2/2019 |

(Continued)

OTHER PUBLICATIONS

International Search Report and Written Opinion of PCT Application No. PCT/JP2021/007093, issued on May 18, 2021, 09 pages of ISRWO.

*Primary Examiner* — Hongmin Fan
(74) *Attorney, Agent, or Firm* — CHIP LAW GROUP

(57) ABSTRACT

There is provided an information processing apparatus according to the present disclosure includes a recognition processing portion that performs recognition processing of a recognition target based on a captured image of a surrounding environment of a mobile body, and an output control portion that causes, when the recognition target is not recognized, an output apparatus to output non-recognition notification information indicating that the recognition target is not recognized.

18 Claims, 16 Drawing Sheets

(56) References Cited

FOREIGN PATENT DOCUMENTS

| JP | WO 2020067070 | * | 9/2019 | ............. G08G 1/164 |
| JP | 2019-168983 A | | 10/2019 | |

* cited by examiner

Fig. 4

Fig. 7
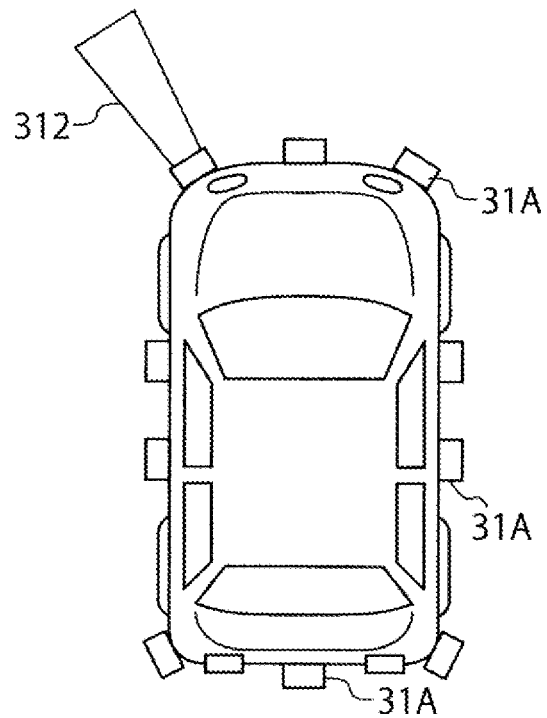
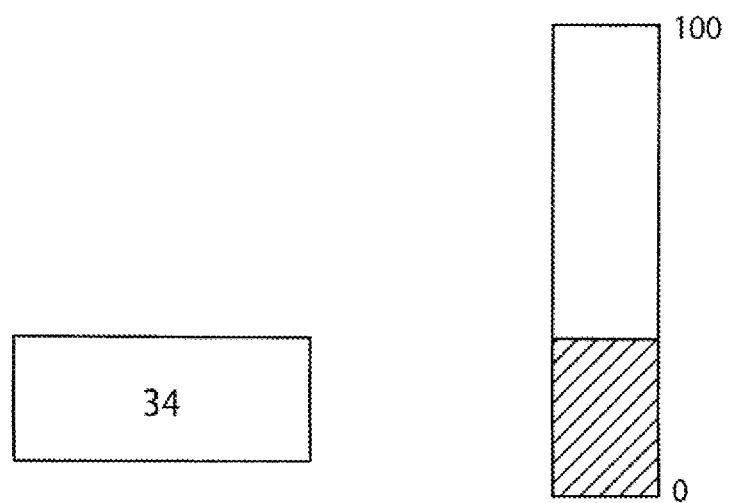
Fig. 8A
Fig. 8B

OBJECT DETECTION SYSTEM, INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2021/007093 filed on Feb. 25, 2021, which claims priority benefit of Japanese Patent Application No. JP 2020-046726 filed in the Japan Patent Office on Mar. 17, 2020. Each of the above-referenced applications is hereby incorporated herein by reference in its entirety.

TECHNICAL FIELD

The present disclosure relates to an information processing apparatus, an information processing method, and a computer program.

BACKGROUND ART

In order to enhance safety when driving a vehicle, methods are being proposed for avoiding danger by presenting information on objects having a risk of collision when the vehicle is traveling. For example, PTL 1 below describes a vehicle which illuminates an entire road surface ahead of the vehicle in a state where a pedestrian is not recognized and which irradiates, only when a pedestrian is recognized, the pedestrian with a directional white light beam. According to this method, the pedestrian can be notified that he/she is being recognized by the vehicle and, at the same time, the pedestrian's attention can be drawn.

CITATION LIST

Patent Literature

[PTL 1]
  JP 2019-21433 A

SUMMARY

Technical Problem

However, since this method only operates when a pedestrian is recognized, when the vehicle is unable to recognize pedestrians, the attention of the pedestrians cannot be drawn. Therefore, unless the vehicle can be recognized by pedestrians, there is a risk that pedestrians may collide with the vehicle.

The present disclosure provides an information processing apparatus, an information processing method, and a computer program which enable highly safe travel.

Solution to Problem

An information processing apparatus according to the present disclosure includes: a recognition processing portion configured to perform recognition processing of a recognition target based on a captured image captured of a surrounding environment of a mobile body; and an output control portion configured to cause an output apparatus to output, when the recognition target is not recognized, non-recognition notification information indicating that the recognition target is not recognized.

The recognition processing portion is configured to perform object detection based on the captured image, and the output control portion is configured to cause the output apparatus to output the non-recognition notification information when an object that is the recognition target is not detected.

When an object of which type is unknown is detected by the recognition processing portion, the output control portion is configured to cause the output apparatus to output the non-recognition notification information.

An object of which type is unknown is an object of which a recognition score is lower than a threshold.

The recognition processing portion is configured to identify a state of a target represented by the object of which type is unknown, and the output control portion is configured to cause the output apparatus to output the non-recognition notification information using a medium in accordance with a state of the target.

The medium includes at least one of light, sound, vibration, wind, and radio waves.

The output control portion is configured to modify a parameter of the non-recognition notification information in accordance with a value of a recognition score of the object of which type is unknown.

The recognition processing portion is configured to identify a state of a target represented by the object of which type is unknown, and the output control portion is configured to modify a parameter of the non-recognition notification information in accordance with a state of the target.

The state of the target includes at least one of a movement speed of the target, a movement direction of the target, and a distance to the mobile body.

The recognition processing portion is configured to calculate a degree of risk of a target represented by the object of which type is unknown, and the output control portion is configured to modify a parameter of the non-recognition notification information in accordance with the degree of risk.

When the recognition target is recognized, the output control portion is configured to cause the output apparatus to output recognition notification information indicating that the recognition target is recognized.

The recognition processing portion is configured to perform object detection based on the captured image, and the output control portion is configured to cause, when an object that is a recognition target is detected, the output apparatus to output the recognition notification information.

The recognition processing portion is configured to identify a state or an attribute of the recognition target, and the output control portion is configured to cause the output apparatus to output the recognition notification information using a medium in accordance with the state or the attribute of the recognition target.

The output control portion is configured to modify a parameter of the non-recognition notification information in accordance with a recognition score of an object that is the recognition target.

The recognition processing portion is configured to identify a state or an attribute of the recognition target, and the output control portion is configured to modify a parameter of the recognition notification information in accordance with the state or the attribute of the recognition target.

The state of the recognition target is a state related to at least one of a sense of vision, a sense of hearing, a sense of touch, a sense of smell, and a sense of taste of the recognition target.

The recognition processing portion is configured to calculate a degree of risk of the recognition target, and the output control portion is configured to modify a parameter of the recognition notification information in accordance with the degree of risk.

The recognition processing portion is configured to perform, based on the captured image, the recognition processing with respect to a recognition target view angle that is a part of an angle of view of the captured image, and when the recognition target is not recognized, the output control portion is configured to cause the output apparatus to output the non-recognition notification information in a direction corresponding to the part of the angle of view.

An information processing method according to the present disclosure includes the steps of:

performing recognition processing of a recognition target based on a captured image of a surrounding environment of a mobile body; and causing, when the recognition target is not recognized, an output apparatus to output non-recognition notification information indicating that the recognition target is not recognized.

A computer program according to the present disclosure causes a computer to execute the steps of:

performing recognition processing of a recognition target based on a captured image of a surrounding environment of a mobile body; and causing, when the recognition target is not recognized, an output apparatus to output non-recognition notification information indicating that the recognition target is not recognized.

BRIEF DESCRIPTION OF DRAWINGS

FIG. 4 is a diagram showing an example of a score map storing a recognition score of each pixel.

FIG. 7 is a diagram showing an example of light emission when an unknown body object is detected ahead to the left of the vehicle.

FIGS. 8A and 8B are diagrams showing a display example of a recognition score.

DESCRIPTION OF EMBODIMENTS

Hereinafter, embodiments of the present disclosure will be described with reference to the drawings. It is to be understood that, in one or more embodiments presented in the present disclosure, elements included in each embodiment may be combined with each other and resultant objects combining such elements also constitute a part of the embodiments presented in the present disclosure.

Figure 1:
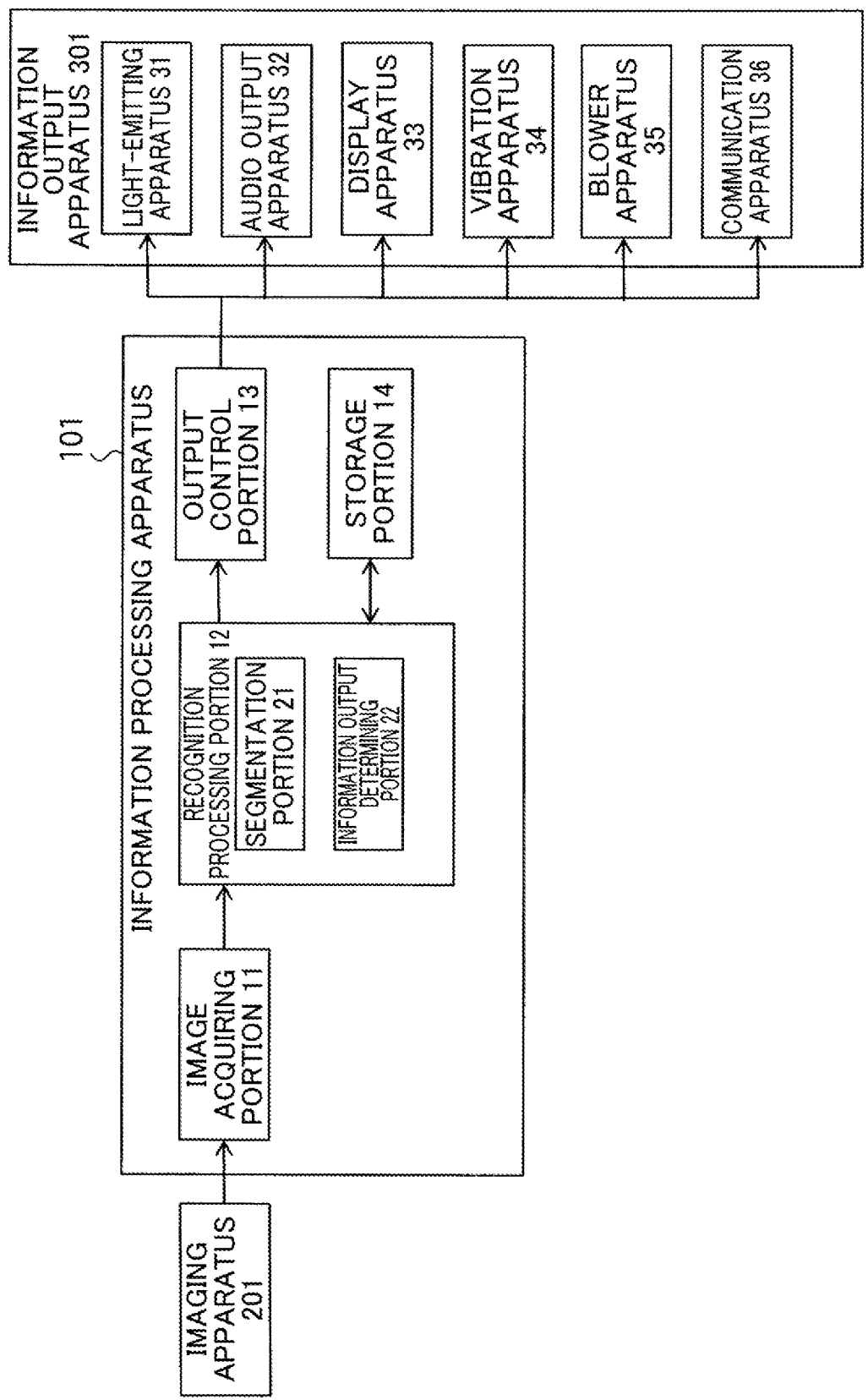
FIG. 1 is a block diagram of a vehicle warning system including an information processing apparatus according to a first embodiment.

FIG. 1 is a block diagram of a vehicle warning system including an information processing apparatus according to a first embodiment. An information processing apparatus 101 shown in FIG. 1 is mounted to a vehicle such as an automobile, an electric car, a hybrid electric car, a motorcycle, or a bicycle. While a case where a technique according to the present disclosure is applied to a vehicle will be presented in the following description, alternatively, the technique according to the present disclosure can also be applied to various products. For example, the technique according to the present disclosure can be realized as an apparatus to be mounted on any kind of mobile body such as an AGV (Automated Guided Vehicle), a personal mobility, an airplane, a drone, a ship, a mobile robot, a construction machine, and an agricultural machine (tractor).

Vehicles on which the information processing apparatus 101 is mounted can be any of an autonomous vehicle in which all operations are autonomously performed, an automated vehicle in which all operations are automated under certain conditions, a semi-automated driver in which driving by a driver is assisted by automating a part of operations, and an automobile of which operations are neither automated nor assisted. When the information processing apparatus 101 is to be mounted on an autonomous vehicle in which all operations are autonomously performed, a driver need not be present. The following description assumes a case of an autonomous vehicle without a driver.

An overview of the first embodiment is as follows. The information processing apparatus 101 shown in FIG. 1 acquires a captured image of a surrounding environment from an imaging apparatus 201 while the vehicle is traveling and performs recognition processing of a recognition target based on the acquired captured image. While an example of the recognition target is a person, the recognition target may be a living being other than a person such as a dog or a cat. When a recognition target is not recognized as a result of the recognition processing, the information processing apparatus 101 outputs non-recognition notification information indicating that the recognition target is not recognized to the surrounding environment via a medium such as light or sound.

Specifically, the information processing apparatus 101 performs object detection based on the captured image and determines a type (hereinafter, referred to as class) of the object and calculates a recognition score indicating a level of reliability of the class determination. When an object of which the recognition score is lower than a threshold is detected, the class of the object is assumed to be an unknown class. In addition, an object of which the class is unknown is assumed to be an unknown body object, and a target represented by the unknown body object is assumed to be an unknown body. Non-recognition notification information is output when an unknown body object is detected or when an object being a recognition target is not detected.

Non-recognition notification information is information which notifies that the vehicle is not recognizing a person in the surrounding environment. An output method of the non-recognition notification information may involve emitting light of a specific color, outputting a specific sound, or other methods. A person who comes into contact with non-recognition notification information can comprehend that he/she is not being recognized by a vehicle traveling nearby and can take action like moving away from the vehicle. Accordingly, even if a person is not being recognized by a vehicle, the person can be alerted. Hereinafter, the first embodiment will be further described in detail.

The vehicle warning system shown in FIG. 1 includes an imaging apparatus 201, the information processing apparatus 101, and an information output apparatus (an output apparatus) 301.

The imaging apparatus 201 is an apparatus which captures images of a surrounding environment of the vehicle and which acquires image data. For example, operations of the imaging apparatus 201 are controlled by an integrated control unit (refer to FIG. 17 to be described later) of the vehicle. For example, the imaging apparatus 201 captures images at a constant sampling interval.

The imaging apparatus 201 includes at least one of a monocular camera, a stereo camera, a ToF (time of flight) camera, an infrared camera, and other cameras. Examples of installation positions of the camera include at least one of a front nose, a side-view mirror, a rear bumper, a back door, and an upper part of a windshield of a vehicle cabin of a vehicle (refer to FIG. 18 to be described later). Cameras provided on the front nose and the upper part of the windshield in the vehicle cabin mainly acquire images in front of the vehicle. Cameras provided on the side-view mirrors mainly acquire images on a lateral side of the vehicle. The camera provided on the rear bumper or the back door mainly acquires images behind the vehicle. Data of images captured by a plurality of cameras may be combined to generate a bird's eye image or a panoramic image.

The information processing apparatus 101 includes an image acquiring portion 11, a recognition processing portion 12, an output control portion 13, and a storage portion 14. The recognition processing portion 12 includes a segmentation portion 21 and an information output determining portion 22. An input apparatus used by a user (an occupant) to input data or an instruction and a display apparatus that displays data to the user when the user is present inside the vehicle may be provided.

The image acquiring portion 11 acquires data of an image captured by the imaging apparatus 201 and provides the recognition processing portion 12 with the acquired image data. The image acquiring portion 11 may perform pre-processing on the acquired image data. Examples of pre-processing include size conversion processing and missing value processing.

The segmentation portion 21 of the recognition processing portion 12 performs recognition processing of a recognition target based on image data provided by the image acquiring portion 11. Specifically, first, the segmentation portion 21 performs object detection based on the image data. In object detection, for example, at least one of segmentation and clustering can be used. While an example of using semantic segmentation will be shown in the first embodiment, the use thereof is not restrictive.

Semantic segmentation is a method of classifying, in pixel units, a class (type) of each pixel of image data. A class is determined for each pixel and a label indicating the determined class is output for each pixel. For example, a class is defined in advance for each of a plurality of objects such as a person, a background, a utility pole, a road, a pedestrian crossing, a tree, and a building. Each class is assigned a specific color. In addition to determining a class, a recognition score that represents a degree of reliability of the determination of the class is calculated with respect to each pixel. The determined class is adopted only with respect to pixels of which recognition scores are equal to or higher than a threshold. Pixels of which recognition scores are lower than the threshold are considered indeterminable pixels and are decided to be an unknown body class.

As a result of the semantic segmentation, a class map storing a class value corresponding to each pixel of image data and a score map storing a recognition score of each pixel are obtained. In addition, a segmentation image is obtained by converting each class value of the class map into a color value based on a correspondence table between color and class.

In a segmentation image, a continuous group of a same color value corresponds to a single object. Pixels on an outermost extension of the object constitute a boundary of the object. A statistical value (a mean, a median, a minimum, a maximum, or the like) of recognition scores of pixels belonging to the object is adopted as the recognition score of the object. An object of which the recognition score is lower than a threshold corresponds to an unknown body object.

As an example, such semantic segmentation can be performed using a learned neural network. Image data is used as input to the neural network. In processing using the neural network, a class of each pixel is predicted in pixel units. Outputs of the neural network are a class map including a class value (a numerical value) assigned to each pixel of the input image data and a score map storing the recognition score of each pixel. A segmentation image is obtained by referring to a correspondence table between class and color and replacing each class value of the class map with a color value corresponding to the class value. Displaying the segmentation image enables a segmentation result to be visualized. In the processing using the neural network, a determined class is decided for pixels of which the recognition score is equal to or higher than the threshold but an indeterminable class is decided for pixels of which the recognition score is lower than the threshold.

For example, a class map and a score map have a same image size. In other words, the numbers of pixels in a class map and a score map are the same and a class and a recognition score are present for each pixel. The segmentation portion 21 stores a class map and a score map in the storage portion 14. The correspondence table between class and color may be stored in the storage portion 14. The segmentation image may be stored in the storage portion 14.

The storage portion 14 stores a class map and a score map obtained by the segmentation portion 21. In addition, the storage portion 14 may store at least one of a correspondence table between class and color and a segmentation image. The storage portion 14 is an arbitrary recording medium such as a memory, an SSD (Solid State Drive), or a hard disk. The memory may be a non-volatile memory or a volatile memory.

Hereinafter, a specific example of an operation of the segmentation portion 21 will be described with reference to FIGS. 2 to 4.

Figure 2:
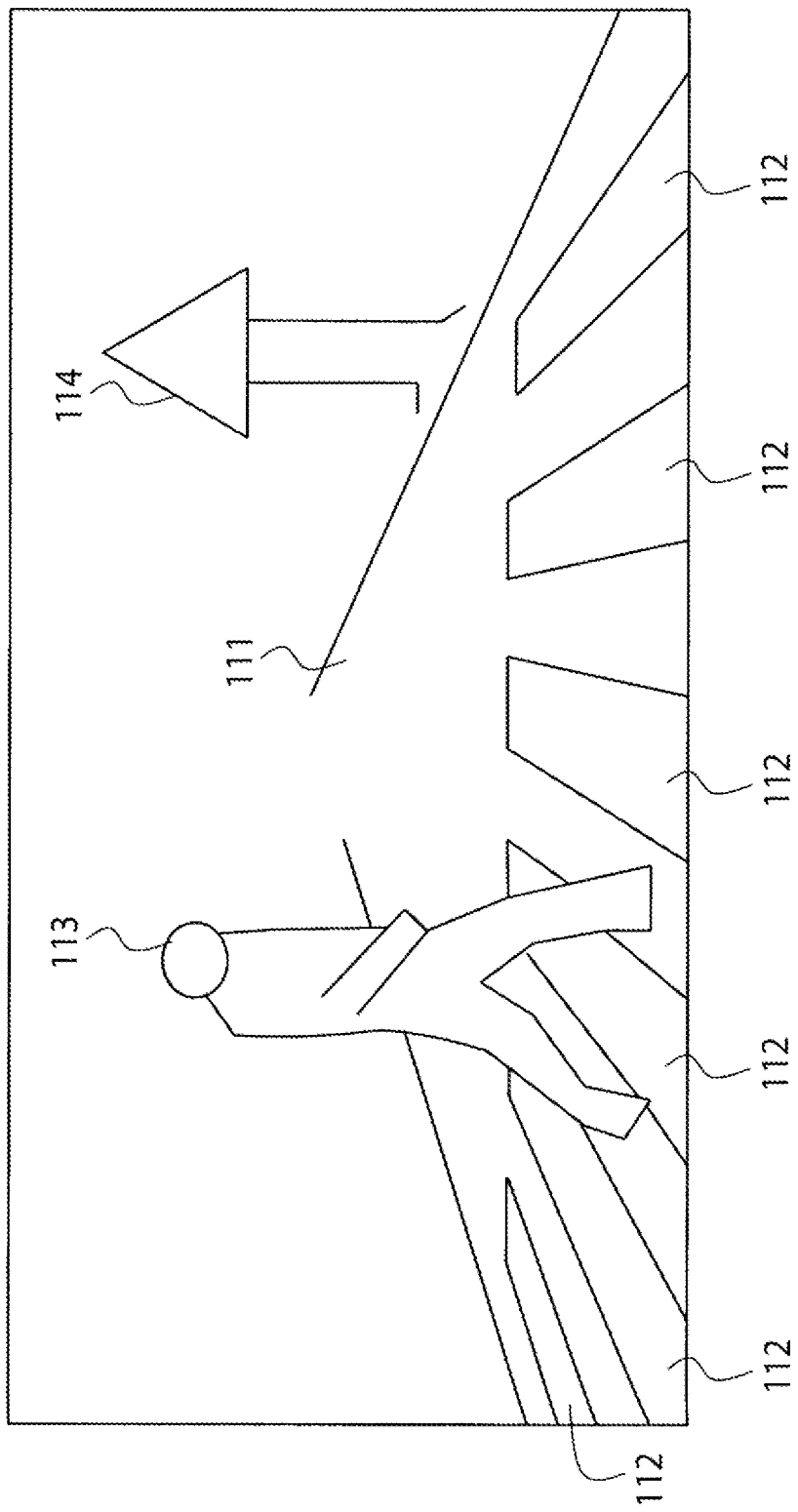
FIG. 2 is a diagram showing an example of image data acquired by an imaging apparatus.

FIG. 2 shows an example of image data acquired by the imaging apparatus 201. In this example, a road 111 runs from a near side to a far side of the drawing and a pedestrian crossing 112 is provided across the road 111. A pedestrian 113 who is a person is crossing the pedestrian crossing. A tree 114 has been planted along the road 111. While other items such as a sidewalk, a street light, and a building and other pedestrians may actually be present, such items and pedestrians have been omitted here for the sake of simplicity. As an exemplary situation, a vehicle is traveling along the road late at night and visibility is low.

Figure 3:
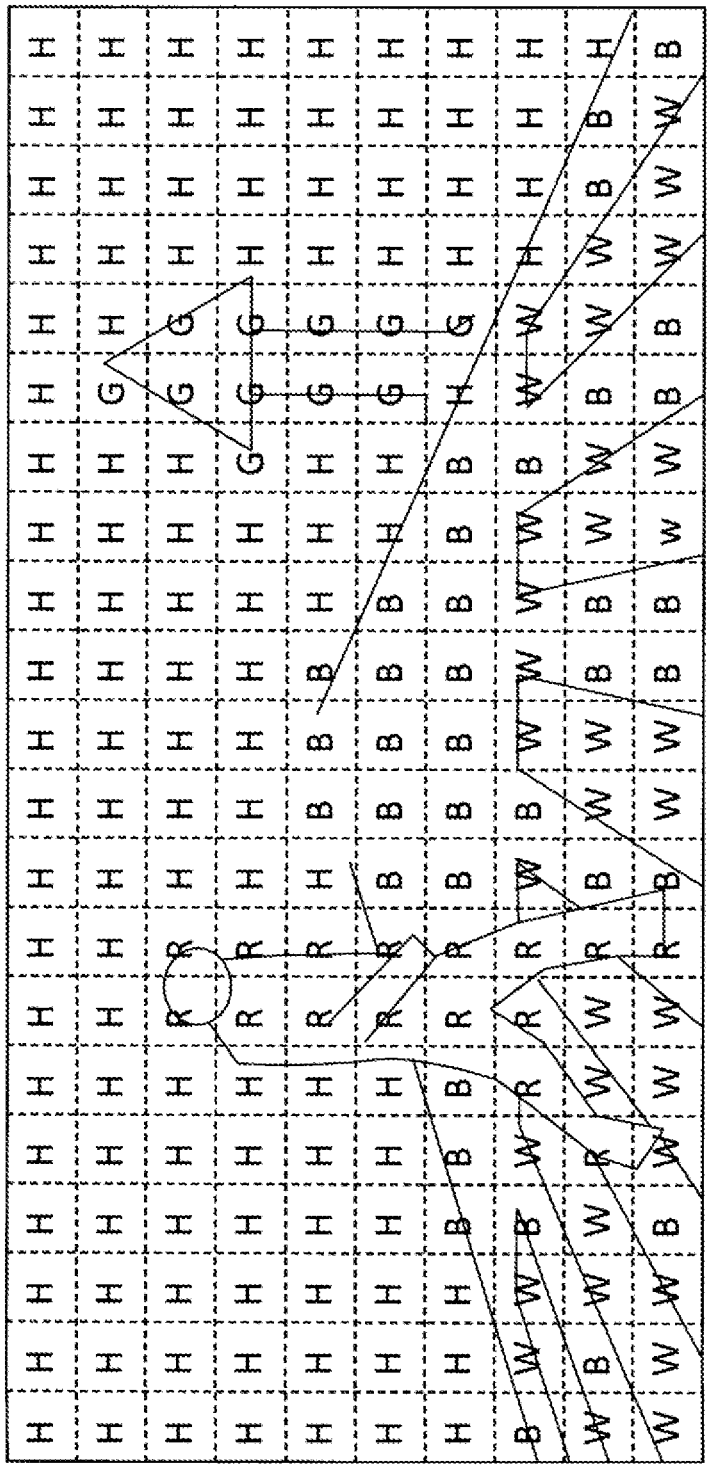
FIG. 3 is a diagram showing a result of class classification in pixel units.

FIG. 3 is a segmentation image showing a result of classifying each pixel of image data in pixel units. As described above, the segmentation image can be obtained by converting a class map according to a correspondence table between class and color. Each pixel of the segmentation image is given a color value. A same color value corresponds to a same class. For example, R is red, G is green, W is white, B is gray, and H is blue. A tree class is assigned to G, a sidewalk class is assigned to W, a road class is assigned to B, and a background class is assigned to H. In addition, an indistinguishable class is assigned to R.

Figure 4:
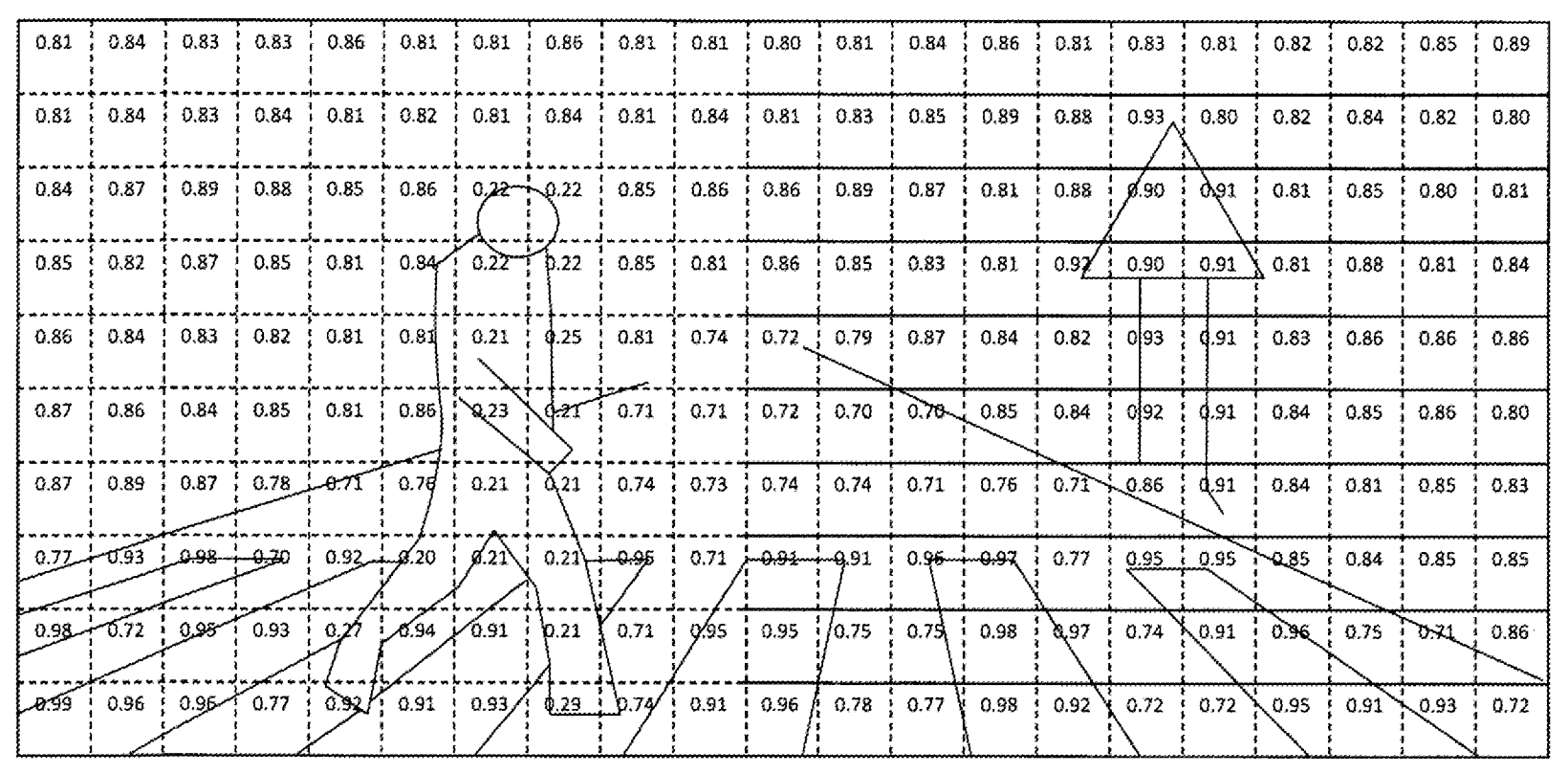

FIG. 4 shows an example of a score map storing a recognition score of each pixel. For example, a recognition score is within a range of 0 or more and 1 or less or 0 or more and 100 or less. The larger the value, the higher the reliability of the determined class. When the recognition score of a determined class is equal to or higher than a threshold, the class is decided with respect to the pixel, but when the recognition score is lower than the threshold, the predicted class is not adopted and an indistinguishable class is decided with respect to the pixel. The threshold is set to, for example, 0.6.

As shown in FIG. 4, recognition scores of pixels belonging to each image of a tree, a sidewalk, a road, and a background are all equal to or higher than the threshold and the determined classes are decided with respect to the pixels. For example, a recognition score of a pixel belonging to the image of a tree is 0.9 or higher, and 0.9 is equal to or higher than the threshold. Since the tree class has been determined with respect to the pixel belonging to the image of a tree, as shown in FIG. 3, the color value G that corresponds to the tree class is assigned to the pixel.

On the other hand, as shown in FIG. 4, a recognition score of a pixel belonging to the image of a person is within a range of 0.2 to 0.3 and the range of 0.2 to 0.3 is lower than the threshold. While a recognition score equal to or higher than the threshold is expected in the case of daytime photography in a bright environment, since the photography took place at night in a dark environment, the recognition score is low. In this case, even if a person class is predicted with respect to a pixel belonging to an image of a person, the prediction result is not adopted due to the low recognition score. As shown in FIG. 3, a color value R corresponding to an indistinguishable class is assigned to the pixel belonging to an image of a person.

A continuous group of a same color value corresponds to a single object. For example, a continuous group of the color value G corresponds to a single object. The object has a tree class that corresponds to G. In addition, a continuous group of the color value R corresponds to a single object. The object has an indistinguishable class that corresponds to R. The same applies to other color values. Pixels on an outermost extension of the object constitute a boundary of the object. While the segmentation image in FIG. 3 has a low resolution with respect to a size of image data and pixels on an outermost extension of a continuous region of a same color value do not accurately match an contour of the object for the sake of description, by sufficiently increasing resolution (for example, to a same resolution as the image data), the pixels on an outermost extension of a continuous region of a same color value can be caused to match or approximately match the contour of the object.

Based on a class map or a segmentation image, the information output determining portion 22 determines whether or not an object of an indistinguishable class is present. When an object of an indistinguishable class (an unknown body object) is present, a decision is made to output non-recognition notification information which indicates that a recognition target (in this case, a person) has not been recognized. Accordingly, when a target (unknown body) represented by the unknown body object is a person, the person can be notified of the fact that a vehicle is not recognizing the person. A determination may be made as to whether a size (number of pixels) of an indistinguishable object is equal to or larger than a certain size and the non-recognition notification information may be output only when equal to or larger than the certain size. When the size of the indistinguishable object is smaller than the certain size, assuming that the likelihood of the unknown body being a person is low, the non-recognition notification information need not be output. The certain size may be decided in accordance with a distance to the object. For example, the longer the distance, the smaller the certain size. For example, the distance to the object can be calculated using a stereo camera or a ToF camera. Alternatively, the distance can be calculated using a distance sensor.

While a presence or absence of an unknown body object has been specified based on a class map or a segmentation image, the presence or absence of an unknown body object may be specified based on a score map. For example, whether or not there is a region with continuous pixels of which a recognition score is lower than the threshold is determined based on a score map. When there is such a region, a decision to output non-recognition notification information is made. A decision to output the non-recognition notification information may be made only when a size (number of pixels) of the region is equal to or larger than a certain size.

When a decision is made to output non-recognition notification information, the information output determining portion 22 provides the output control portion 13 with information for instructing output of the non-recognition notification information. In doing so, the information output determining portion 22 may decide a medium for outputting the non-recognition notification information and the output control portion 13 may be instructed of the information indicating the decided medium. Examples of the medium include light, sound, vibration, radio waves, air, and liquid.

There may be one or a plurality of instructed media. In addition, a parameter of the non-recognition notification information may be decided and the output control portion 13 may be instructed of the decided parameter. For example, when light is to be used as the medium, at least one of a color, luminosity, brightness, saturation, and a blink rate is designated as the parameter. The decision of the medium and the parameter may be made based on a state of an unknown body.

When an object of a class of a recognition target (person) is detected or, in other words, when the recognition target is recognized, the information output determining portion 22 decides to output recognition notification information with respect to the recognition target. An object of a class of the recognition target (person) is referred to as a recognition target object (a person object).

Recognition notification information is information used by the vehicle to notify a recognition target in a surrounding environment that the recognition target is being recognized. The person (such as a pedestrian) having been notified of the recognition notification information can comprehend that he/she is being recognized by the vehicle. Accordingly, the person can expect that the vehicle will travel without approaching the person and can feel safe. In addition, attention can be drawn to the fact that the vehicle is approaching. Even attention of a person not aware of the traveling vehicle can be drawn to the approach of the vehicle.

When a decision is made to output recognition notification information, the information output determining portion 22 provides the output control portion 13 with information for instructing the output of the recognition notification information. In doing so, the information output determining portion 22 may decide a medium for outputting the recognition notification information and instruct the output control portion 13 of information indicating the decided medium. In addition, a parameter of the recognition notification information may be decided and the output control portion 13 may be instructed of the decided parameter. The decision of the medium and the parameter may be performed based on the state of the recognition target.

When both a recognition target object and an unknown body object are detected, the information output determining portion 22 may output both recognition notification information and non-recognition notification information. Alternatively, the information output determining portion 22 may only output one of recognition notification information and non-recognition notification information. For example, when both a recognition target object and an unknown body object are detected, only non-recognition notification information may be output.

When instruction information for outputting non-recognition notification information is received from the recognition processing portion 12, the output control portion 13 causes the information output apparatus 301 to output the non-recognition notification information in accordance with the instruction information. The instruction information may include at least one of a medium and a parameter used to output non-recognition notification information. When neither a medium nor a parameter is included, the non-recognition notification information is output using a medium and a parameter designated in advance.

In addition, when instruction information for outputting recognition notification information is received from the recognition processing portion 12, the output control portion 13 causes the information output apparatus 301 to output the recognition notification information in accordance with the instruction information. The instruction information may include at least one of a medium and a parameter used to output recognition notification information. When neither a medium nor a parameter are included, the recognition notification information is output using a medium and a parameter designated in advance.

The information output apparatus 301 includes a light-emitting apparatus 31, an audio output apparatus 32, a display apparatus 33, a vibration apparatus 34, a communication apparatus 36, and a blower apparatus 35. The elements 31 to 36 are notification units that notify the surrounding environment of at least one of non-recognition notification information and recognition notification information. The information output apparatus 301 need not include all of the notification units 31 to 36. The information output apparatus 301 need only include one or more of the notification units 31 to 36.

The light-emitting apparatus 31 is an apparatus that is capable of visually notifying information to at least outside of the vehicle. The medium that transmits information is light. For example, the light-emitting apparatus 31 includes at least one light source. Examples of a light source include an LED, an incandescent lamp, a laser, a vision-restricting light, and a lamp. A laser is used for, for example, road surface illumination. Vision restriction and the like enables lighting to be viewed from a specific direction. The light-emitting apparatus 31 is provided at a location from which light emission of the light source is visible from the surrounding environment. The light-emitting apparatus 31 may be provided in a vicinity of various lamps such as a headlamp, a tail lamp, a brake light, a turn signal, and a fog lamp. Alternatively, the light-emitting apparatus 31 may be provided on a roof of a vehicle body. When the light-emitting apparatus 31 includes a plurality of light sources, a plurality of light sources may be provided on both sides of the windshield or a plurality of light sources may be arranged at intervals along a periphery (for example, front-rear and left-right) in a lower part of the vehicle.

At least one of a color, luminosity, saturation, and a blink rate of a light source may be modifiable as a parameter. In addition, when the light-emitting apparatus 31 includes a plurality of light sources, the number of light sources that can be operated may be modifiable as a parameter. Furthermore, when the light-emitting apparatus 31 includes a plurality of light sources with different colors, the colors of the light sources to be operated may be modifiable (increasable/decreasable) as a parameter. Moreover, when the light-emitting apparatus 31 includes a plurality of light sources with different sizes, the sizes of the light sources to be operated may be modifiable as a parameter.

The audio output apparatus 32 is an audio output apparatus capable of auditorially notifying information to at least the outside of the vehicle. The medium that transmits information is sound. The audio output apparatus 32 includes at least one speaker. The audio output apparatus 32 is installed at an arbitrary location such as a roof of the vehicle, a side surface, a front surface, or a rear surface of the vehicle, or on both sides of the windshield. The audio output apparatus 32 may include a plurality of speakers and the plurality of speakers may be arranged at a plurality of locations.

The audio output apparatus 32 converts an audio signal formed from reproduced audio data, acoustic data, or the like into an analog signal and auditorially outputs the converted analog signal. Adjusting audio data, acoustic data, or the like enables a volume, a pitch (frequency), a melody (rhythm), and a tempo (beat) to be modified as parameters.

In addition, in the case of sound, modifying audio data enables contents of the sound to be modified as a parameter.

The display apparatus 33 is an apparatus that visually displays information in various formats such as a text, an image, a table, and a graph. The medium that transmits information is light. The display apparatus 33 is installed at an arbitrary location such as a roof of the vehicle, a side surface or a front surface of the vehicle, or on both sides of the windshield. The display apparatus 33 may include a plurality of display portions and the plurality of display portions may be arranged at a plurality of locations.

Various messages and data can be displayed on the display apparatus 33. Contents to be displayed can be modified as a parameter. For example, a recognition score may be displayed. In addition, when a recognition score of a recognition target object is lower than a threshold, a value of the recognition score may be displayed on a display portion 33 as non-recognition notification information. The value of a recognition score may be displayed by an indicator gauge or displayed by a text. A low recognition score enables a pedestrian to determine that he/she is likely not to be recognized. The value of a recognition score may be displayed as recognition notification information.

In addition, a message expressing that a recognition target is not being recognized such as a message reading "Currently, a pedestrian is not recognized!" may be displayed as non-recognition notification information on the display apparatus 33. Furthermore, a message expressing that a recognition target is being recognized such as a message reading "Currently, a pedestrian is being recognized!" may be displayed as recognition notification information. Alternatively, non-recognition notification information or recognition notification information may be displayed in other modes.

The vibration apparatus 34 is an apparatus that outputs information using vibration. The medium that transmits information is vibration. A vibrating sound may be output as information or information may be output by transmitting vibration to a recipient via the ground or another body. In the latter case, information can also be transmitted to visually-impaired and hearing-impaired pedestrians. The vibration apparatus 34 is installed at an arbitrary location such as a roof of the vehicle, a side surface or a front surface of the vehicle, or on both sides of the windshield. The vibration apparatus 34 may include a plurality of vibrating portions and the plurality of vibrating portions may be arranged at a plurality of locations. The vibration apparatus 34 vibrates based on a supplied vibration signal. By adjusting the vibration signal to be supplied to the vibration apparatus 34 as a parameter, a vibration pattern can be modified. For example, vibration patterns can be differentiated between a case of non-recognition notification information and a case of recognition notification information. A vibration pattern includes a magnitude, a speed, a rhythm, and the like of vibration.

The blower apparatus 35 is an apparatus that outputs information via air. The medium that transmits information is air. The blower apparatus 35 is installed at an arbitrary location such as a roof of the vehicle, a side surface or a front surface of the vehicle, or on both sides of the windshield. The blower apparatus 35 may include a plurality of blower portions and the plurality of blower portions may be arranged at a plurality of locations. A directionality of air from each of the blower portions may be controllable. The blower apparatus 35 blows air based on a supplied blower signal. By adjusting the blower signal to be supplied to the blower apparatus 35 as a parameter, a direction or a strength of air can be modified. For example, air patterns can be differentiated between a case of non-recognition notification information and a case of recognition notification information. An air pattern includes a magnitude, a speed, a rhythm, and the like of air. Information may be transmitted using a sense of smell of a target by having air include a specific smell.

The communication apparatus 36 outputs information by wirelessly communicating with a wireless communication apparatus such as a communication terminal or a wireless station. The medium that transmits information is a radio wave. An example of the communication terminal is a wireless communication apparatus held by a person such as a pedestrian and an example of a wireless station is a wireless communication apparatus installed on a traffic light, an intersection, or a shoulder of a road. The communication apparatus 36 may be incorporated into vehicle-mounted equipment or installed inside the vehicle as an independent apparatus. A wireless communication protocol used by the communication apparatus 36 may be an arbitrary protocol such as a wireless LAN protocol, Bluetooth (registered trademark), a cellular telecommunication protocol, or a dedicated protocol. The communication apparatus 36 may include one or a plurality of antennas. The communication apparatus 36 may perform directional communication using a plurality of antennas.

The various notification units described above are merely examples and notification units of other types can also be used. For example, means of outputting information by rubbing a body against the ground to produce sound may be adopted. In addition, means of outputting information by injecting a liquid may be adopted. Information may be transmitted using a sense of taste of a target by having the liquid include a specific taste.

Output Example of Non-Recognition Notification Information

A specific example of the information output determining portion 22 outputting non-recognition notification information using the output control portion 13 and the information output apparatus 301 will be described.

Output Example of Non-Recognition Notification Information Using Light-Emitting Apparatus 31

When the output control portion 13 receives instruction information of output of non-recognition notification information from the recognition processing portion 12, the output control portion 13 causes the light-emitting apparatus 31 to emit light in accordance with the instruction information. As an example, the light-emitting apparatus 31 provided on the roof of the vehicle is lighted so that red light is emitted in all directions around the vehicle.

Figure 5:
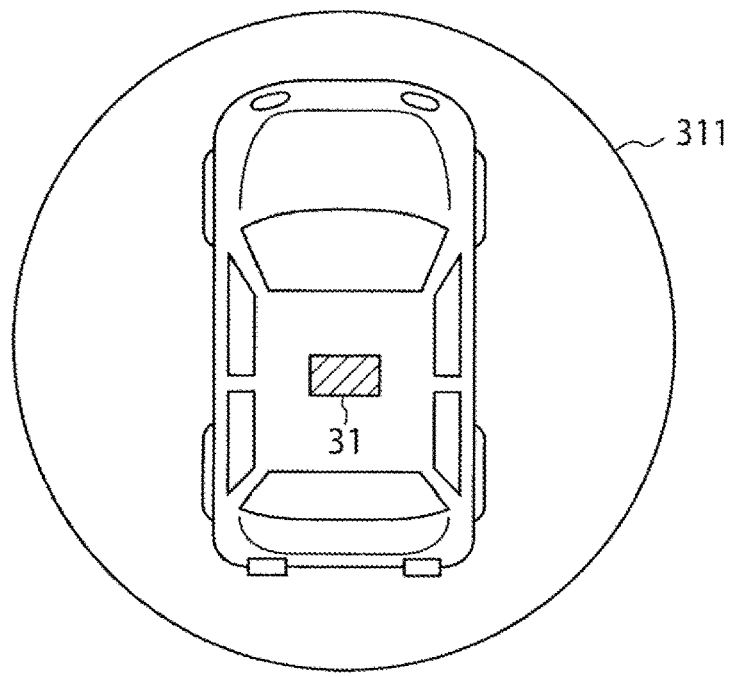
FIG. 5 is a diagram showing an example of lighting, in red, a light-emitting apparatus provided on a roof of a vehicle.

FIG. 5 shows an example in which the light-emitting apparatus 31 provided on the roof of a vehicle is caused to emit red light. A red light source included in the light-emitting apparatus 31 emits light and red light 311 is radiated in all circumferential directions.

As another example, a red light source (for example, a red laser) arranged at intervals along a peripheral direction in a lower part of the vehicle may be lighted. For example, the red laser is installed in an orientation causing the red laser to be emitted toward a road surface.

Figure 6:
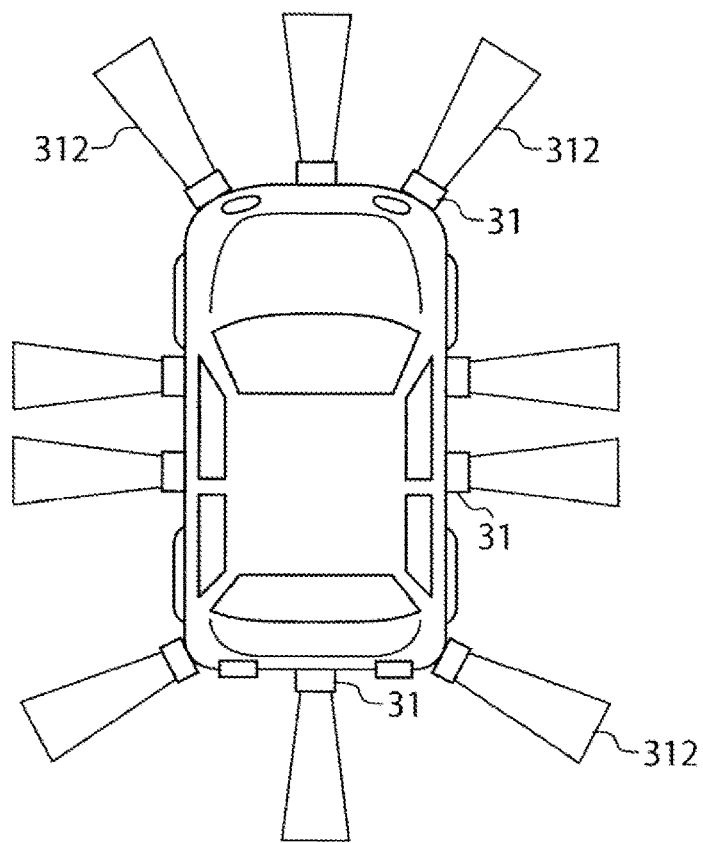
FIG. 6 is a diagram showing an example of lighting a red light source arranged along an entire periphery in a lower part of a vehicle.

FIG. 6 shows an example of lighting a red light source that is arranged along an entire circumference in a lower part of the vehicle. Red light 312 is emitted from each red light source toward the road surface.

By checking emission of red light that is emitted toward the road surface, a person such as a pedestrian can determine that the vehicle is not recognizing the person and can take action such as moving away from the vehicle or attempting to draw the attention of the vehicle toward himself/herself. For example, attempting to draw attention involves acting assertively so that the person is more likely to be recognized by the vehicle such as waving a hand or moving from a dark spot to a bright spot.

While light is emitted in all directions in the example shown in FIG. 5 or FIG. 6, light may be configured to be emitted only in a direction where an unknown body object is present or in a certain directional range including the direction where an unknown body object is present. In this case, the recognition processing portion 12 outputs information indicating the direction where an unknown body object is present or the certain directional range including the direction where an unknown body object is present to the output control portion 13. For example, the output control portion 13 causes a red laser corresponding to the direction instructed by the recognition processing portion 12 or a red laser included in a certain directional range including the direction instructed by the recognition processing portion 12 to emit light.

FIG. 7 shows an example of light emission in a case where an unknown body object is detected ahead to the left of the vehicle in a configuration where red light sources are arranged as shown in FIG. 6. In this case, among a plurality of red light sources 31A, only the red light source 31A installed ahead to the left of the vehicle is caused to emit light. Accordingly, when a person is present ahead to the left of the vehicle, the person can determine that he/she is not being recognized by the vehicle. A pedestrian can take action such as moving away from the vehicle or attempting to draw the attention of the vehicle toward himself/herself.

While an output example of non-recognition notification information using the light-emitting apparatus 31 has been shown in FIGS. 5 to 7, non-recognition notification information can be output in a similar manner when using the other notification units 32 to 36. Hereinafter, several specific examples will be described.

Output Example of Non-Recognition Notification Information Using Audio Output Apparatus 32

For example, let us assume that the audio output apparatus 32 includes a plurality of speakers and the plurality of speakers are arranged at intervals along an entire periphery of the vehicle. As an example, a specific sound signal or an acoustic signal is simultaneously output from all speakers. Alternatively, a specific sound signal or an acoustic signal is output using only a speaker corresponding to a direction in which an unknown body object had been detected or using only a part of the speakers including the speaker. For example, a voice message of "Vehicle traveling!" is output.

Output Example of Non-Recognition Notification Information Using Display Apparatus 33

For example, let us assume that the display apparatus 33 includes one or a plurality of display portions and the one or a plurality of display portions are arranged so that display surfaces thereof face outside (a side opposite to a vehicle body). In this case, for example, a specific message is displayed on all display portions. Alternatively, the specific message is displayed using only a display portion corresponding to a direction in which an unknown body object had been detected or using only a part of the display portions including the display portion. For example, a warning message reading "Caution!" is displayed. The information to be displayed on the display apparatus 33 is not limited to a warning message. For example, a recognition score of the unknown body object may be displayed. The recognition score may be a numerical value or an indicator gauge.

FIGS. 8A and 8B show a display examples of a recognition score. FIG. A shows an example of displaying a recognition score by a numerical value. FIG. B shows an example of displaying a recognition score by an indicator gauge. An example of a case where a value of a recognition score of 34 when a range of the recognition score is from 0 to 100 is shown.

When an unknown body object is present in plurality, a statistical value (a mean, a median, a maximum, a minimum, or the like) of recognition scores of the plurality of unknown body objects may be displayed. In addition, when there are a plurality of display portions, the recognition score may be displayed on the display portion installed in a direction corresponding to an unknown body object.

In addition, a recognition score may be classified into a corresponding level among a plurality of levels and a value of the classified level may be displayed. For example, a recognition score of 0 or more and less than 30 is assumed to belong to level 1, 30 or more and less than 60 is assumed to belong to level 2, and 60 or more and 100 or less is assumed to belong to level 3. Level 2 is displayed when the recognition score is 34.

The vibration apparatus 34 or the blower apparatus 35 can also output non-recognition notification information in a similar manner to the specific examples of the light-emitting apparatus 31, the audio output apparatus 32, and the display apparatus 33 outputting non-recognition notification information.

Output Example of Non-Recognition Notification Information Using Communication Apparatus 36

The communication apparatus 36 transmits a warning signal in all directions by a broadcast or a multicast. A communication terminal having received the warning signal performs an operation determined in advance. For example, a warning message may be displayed on a screen, a warning sound may be emitted, or a terminal main body may be vibrated by driving a vibrator. A person coming into contact with a warning message or the like through an operation of a communication terminal can determine that he/she is not being recognized by the vehicle. A pedestrian can take action such as moving away from the vehicle or attempting to draw the attention of the vehicle toward himself/herself. While an example of transmitting a warning signal to a communication terminal has been described, even when transmitting a warning signal to a wireless station, the warning signal may be similarly transmitted in all directions by a broadcast or a multicast.

The communication apparatus 36 may control strength of a transmission radio wave to set a transmission range of a warning signal to within a certain distance from the vehicle. Accordingly, the warning signal can be prevented from reaching a communication terminal of a pedestrian at a far distance from the vehicle. In addition, the communication apparatus 36 may transmit the warning signal using a radio wave having directionality in a direction where an unknown body object has been detected.

Non-recognition notification information may be output using one of the various notification units 31 to 36 or non-recognition notification information may be output using two or more or all of the notification units 31 to 36. Using all notification units enables a warning to be reliably notified even if a state of a recognition target is not comprehended. For example, let us assume that a target of an unknown body object is a visually impaired pedestrian. In this case, even when the vehicle is unable to recognize that the recognition target is a visually impaired pedestrian, the pedestrian is able to recognize non-recognition notification information by sound among the pieces of non-recognition notification information output from all notification units. Therefore, the pedestrian can be reliably notified of a warning.

Example of Modifying a Parameter of
Non-Recognition Notification Information
According to Recognition Score When outputting non-recognition notification information in accordance with a detection of an unknown body object, a parameter of the non-recognition notification information may be modified in accordance with a recognition score of the unknown body object. For example, when the light-emitting apparatus 31 is used as a notification unit, at least one of a color, luminosity, saturation, and a blink rate may be modified in accordance with a value of a recognition score. For example, the blink rate may be set such that the lower the value of the recognition score, the higher the blink rate. In addition, luminosity or saturation may be set such that the lower the value of the recognition score, the higher the luminosity or the saturation.

In addition, a size of the light source to emit light may be modified in accordance with the value of the recognition score. For example, the smaller the value of the recognition score, the larger the size of the light source to be used. Furthermore, the number of colors of the light source to emit light may be modified in accordance with the value of the recognition score. For example, the smaller the value of the recognition score, the larger the number of colors of light to be emitted.

In addition, when using the audio output apparatus 32 as a notification unit, at least one of a volume, a pitch (frequency), a melody (rhythm), and a tempo (beat) may be modified in accordance with the value of the recognition score. For example, the smaller the value of the recognition score, the higher the volume, the pitch (frequency), or the tempo. In addition, the smaller the value of the recognition score, the faster the melody (rhythm).

Output Example of Recognition Notification
Information

A specific example of the information output determining portion 22 outputting recognition notification information using the output control portion 13 and the information output apparatus 301 will be described. Descriptions in common with a case of outputting non-recognition notification information will be omitted as appropriate.

As an example, light emission of the light-emitting apparatus 31 is controlled so that light with directionality is radiated in a direction where a recognition target object has been detected. For example, the light-emitting apparatus 31 includes a blue light source and radiates directional blue light. As another example, among blue light sources (for example, blue lasers) arranged at intervals along a peripheral direction in a lower part of the vehicle, a blue light source corresponding to a direction in which a recognition target has been detected is caused to emit light. Due to the fact that the recognition target is irradiated with blue light, the recognition target can understand that he/she is being recognized by the vehicle.

In addition, for example, let us assume that the audio output apparatus 32 includes a plurality of speakers and the plurality of speakers are arranged at intervals along an entire periphery of the vehicle. A specific sound signal or an acoustic signal is output using only a speaker corresponding to a direction in which a recognition target object had been detected or using only a part of the speakers including the speaker. For example, a voice message of "You are being recognized!" is output.

In addition, for example, let us assume that the display apparatus 33 includes one or a plurality of display portions and the one or a plurality of display portions are arranged so that display surfaces thereof face outside (a side opposite to a vehicle body). In this case, for example, a specific message is displayed using only a display portion corresponding to a direction in which a recognition target object had been detected or using only a part of the display portions including the display portion. For example, a message reading "You are being recognized!" is displayed. In addition, a recognition score of the recognition target object may be displayed. The recognition score may be a numerical value or an indicator gauge. In addition, a recognition score may be classified into a corresponding level among a plurality of levels and a value of the classified level may be displayed.

The vibration apparatus 34 or the blower apparatus 35 can also output recognition notification information in a similar manner to the specific examples of the light-emitting apparatus 31, the audio output apparatus 32, and the display apparatus 33 outputting recognition notification information.

In addition, for example, the communication apparatus 36 transmits a recognition signal notifying that a recognition target has already been recognized using a directional radio wave in a direction in which a recognition target object has been detected. As an example, a transmission destination address of the recognition signal is a broadcast address or a multicast address. A communication terminal having received the recognition signal performs an operation determined in advance. For example, a recognition message may be displayed on a screen, a predetermined sound may be emitted, or a terminal main body may be vibrated by driving a vibrator. A pedestrian coming into contact with a recognition message or the like through an operation of a communication terminal can determine that he/she is being recognized by the vehicle. The communication apparatus 36 may control strength of a transmission radio wave to set a transmission range of a recognition signal to within a certain distance from the vehicle.

While an example of outputting recognition notification information using various notification units 31 to 36 has been described, recognition notification information may be output using one of the various notification units 31 to 36 or recognition notification information may be output using two or more or all of the notification units 31 to 36. Using all notification units enables a recognition target to be more reliably notified that the recognition target is being recognized by the vehicle.

Example of Modifying Parameter of Recognition
Notification Information in Accordance with
Recognition Score When outputting recognition notification information in accordance with a detection of a recognition target object, a parameter of the recognition notification information may be modified in accordance with a recognition score of the recognition target object. The parameter can be modified in a similar manner to modifying a parameter of non-recognition notification information.

Example of Simultaneously Outputting Non-Recognition Notification Information and Recognition Notification Information When both an unknown body object and a recognition target object are detected, both non-recognition notification information and recognition notification information may be output at the same time. For example, when using the light-emitting apparatus 31, red light is radiated in a direction where the unknown body object has been detected and blue light is radiated in a direction where the recognition target object has been detected. Alternatively, blue light is radiated in the direction where the recognition target object has been detected and red light is radiated in all other directions. Meanings of the colors are in line with traffic lights and red signifies danger while blue signifies safety.

Figure 9:
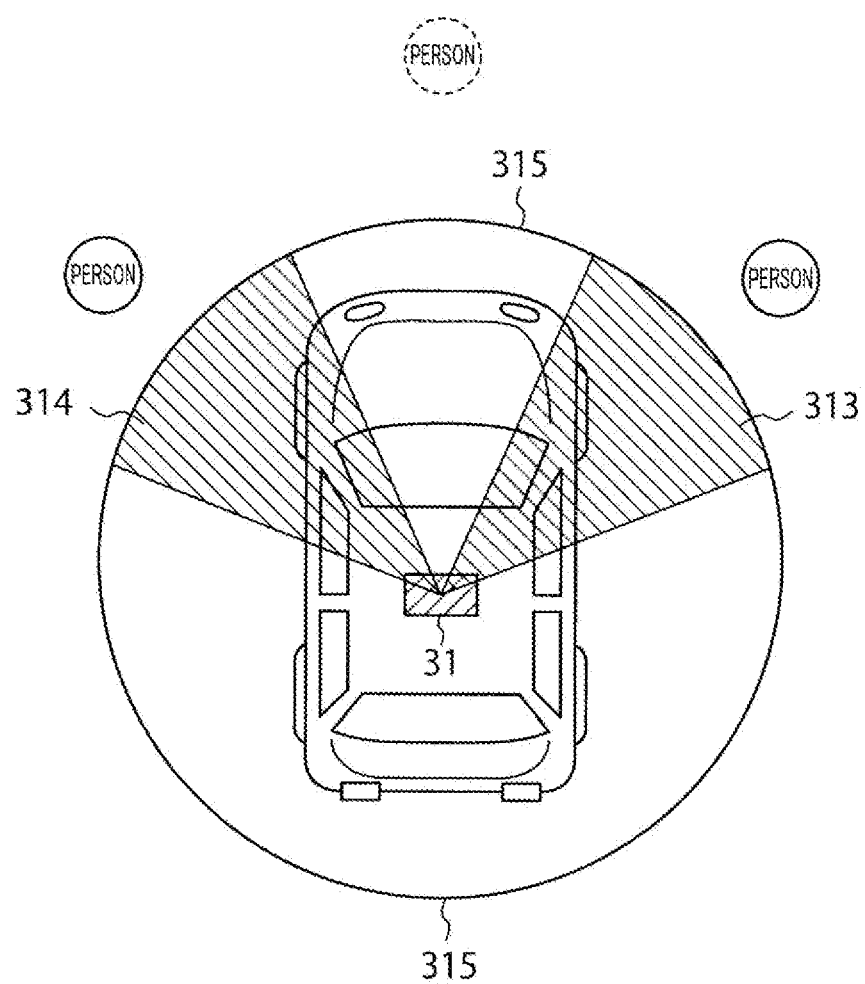
FIG. 9 is a diagram showing a specific example of simultaneously emitting red light corresponding to non-recognition notification information and blue light corresponding to recognition notification information.

FIG. 9 shows a specific example of simultaneously emitting red light corresponding to non-recognition notification information and blue light corresponding to recognition notification information. Blue light beams 313 and 314 are radiated in directions where recognition target objects have been detected. An unknown body object has been detected ahead of the vehicle. Red light 315 is radiated in all directions other than the blue light beams 313 and 314. Red light may only be radiated in a forward direction where the unknown body object has been detected.

Instead of outputting non-recognition notification information (a red light or the like) only when an unknown body object is detected, non-recognition notification information may be constantly and continuously output. For example, a state where red light is constantly radiated from the light-emitting apparatus 31 in all directions may be created. In addition, only when a recognition target object is detected, recognition notification information may be radiated (for example, blue light may be radiated) in a direction of detection and red light may be radiated in all other directions. Accordingly, since the fact that non-recognition by the vehicle can constantly be notified in directions other than the direction in which blue light is radiated, the attention of pedestrians can be drawn. In this case, the information output determining portion 22 instructs the output control portion 13 to constantly and continuously output non-recognition notification information. The output control portion 13 performs control to a state where non-recognition notification information is continuously output. When a recognition target object is detected, the information output determining portion 22 instructs the output control portion 13 to output recognition notification information in a direction of detection. The output control portion 13 outputs recognition notification information in the detected direction. When the recognition target object is no longer detected, the information output determining portion 22 instructs the output control portion 13 to suspend output of the recognition notification information.

Another Example of Object Detection

Processing of the segmentation portion 21 may be performed with respect to a part of an angle of view of the imaging apparatus 201 instead of an entire piece of image data. For example, a part of the angle of view of the imaging apparatus 201 is set as a recognition target view angle. In addition, object detection is performed with respect to the recognition target view angle.

Figure 10:
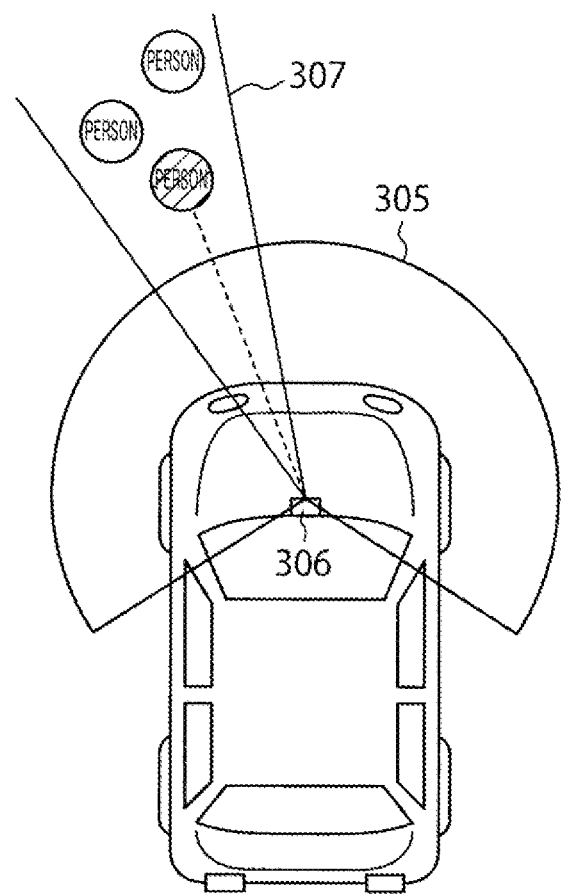
FIG. 10 is a diagram showing an example of performing object detection with respect to a recognition target view angle.

FIG. 10 shows an example of performing object detection with respect to the set recognition target view angle. A camera 306 corresponding to the imaging apparatus 201 is installed in a vicinity of a lower part of a windshield of the vehicle. With respect to an angle of view 305 of the camera 306, a recognition target view angle 307 is set as a part of the angle of view 305. For example, the recognition target view angle 307 is moved clockwise or counterclockwise around the camera 306. Accordingly, the recognition target view angle 307 is sequentially set so as to cover the angle of view 305 as a whole. Object detection is performed using an image portion included in the set recognition target view angle 307 among image data.

In the example shown in FIG. 10, three people (recognition targets) are included in the recognition target view angle 307. By performing object detection with respect to the recognition target view angle 307, when a recognition target is detected, a direction in which the recognition target is present can be readily specified as a direction of the recognition target view angle. In other words, the direction of the recognition target view angle can be used as a direction in which recognition notification information is output to a recognition target.

When a plurality of people are positioned so as to overlap with each other as viewed from a vehicle in object detection as shown in FIG. 10, as long as a nearest person can be detected, the fact that the two persons on a far side cannot be detected (for example, determined to be unknown body objects) does not pose a problem. In other words, at least one person who is most likely to collide may be recognized in a same recognition target view angle. Usually, a nearest person who is not obscured is most readily detected. When at least one person can be detected, since the vehicle does not approach the person or stops, people near the detected person are consequently able to avoid a collision and are therefore safe.

In addition, when a recognition target object is not detected but an unknown body object is detected in a recognition target view angle, non-recognition notification information is output in a direction of detection. Accordingly, even if a person is present in the recognition target view angle, the person can be notified of a warning. In this case, even if a plurality of people overlap with each other as unknown bodies when viewed from the vehicle, non-recognition notification information can be simultaneously notified to the plurality of people. Therefore, a plurality of people can be prompted to take action to avoid colliding with the vehicle.

Figure 11:
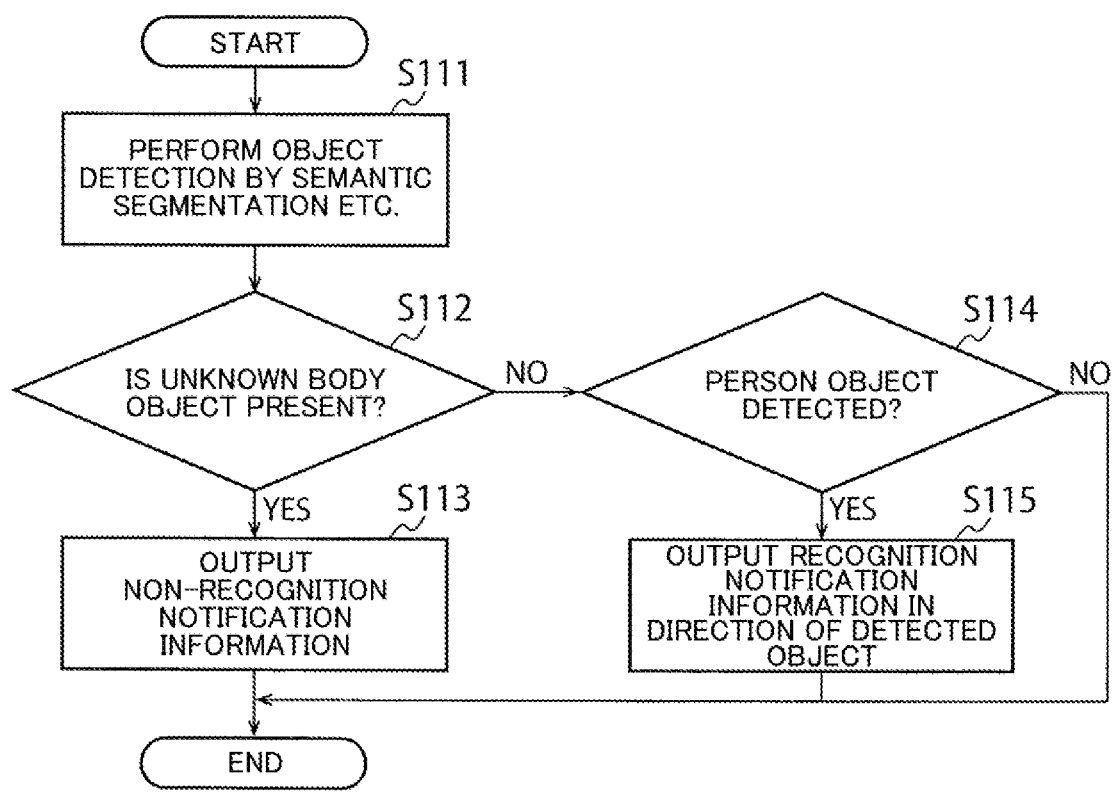
FIG. 11 is a flowchart showing an example of an operation of the information processing apparatus according to the first embodiment.

FIG. 11 is a flowchart showing an example of an operation of the information processing apparatus 101 according to the first embodiment. The segmentation portion 21 performs object detection based on image data acquired by the image acquiring portion 11 (S111). For example, an object is detected using semantic segmentation. A class of the object is determined and a recognition score of the object is acquired. As the recognition score of the object, for example, an average value of recognition scores of pixels included in the object can be used.

The information output determining portion 22 determines whether or not an object (an unknown body object) of which a recognition score is lower than a threshold is present (S112). When an unknown body object is present, a target (an unknown body) represented by the unknown body object is determined to be unknown.

When an unknown body object is present (YES in S112), the information output determining portion 22 decides to output non-recognition notification information. A medium and a parameter for outputting the non-recognition notification information may be decided. The information output determining portion 22 provides the output control portion 13 with an instruction to output non-recognition notification information. Based on the output instruction, the output control portion 13 causes the information output apparatus 301 to output non-recognition notification information (S113). The non-recognition notification information is output using at least one of the notification units 31 to 36. A specific example of outputting non-recognition notification information is as described earlier.

On the other hand, when an unknown body object is not present (NO in S112), the information output determining portion 22 determines whether or not there is a recognition target object among detected objects (S114). In the present example, a determination is made as to whether or not a person object is present. When a person object is not present (NO in S114), the present processing is terminated. When a person object is present (YES in S114), a decision is made to output recognition notification information. A medium and a parameter for outputting recognition notification information may be decided at the same time. The information output determining portion 22 provides the output control portion 13 with an instruction to output recognition notification information. Based on the output instruction, the output control portion 13 causes the information output apparatus 301 to output recognition notification information (S115). For example, the recognition notification information is output in a direction of the detected person object. The recognition notification information is output using at least one of the notification units 31 to 36. A specific example of outputting recognition notification information is as described earlier.

Hardware Configuration

Figure 12:
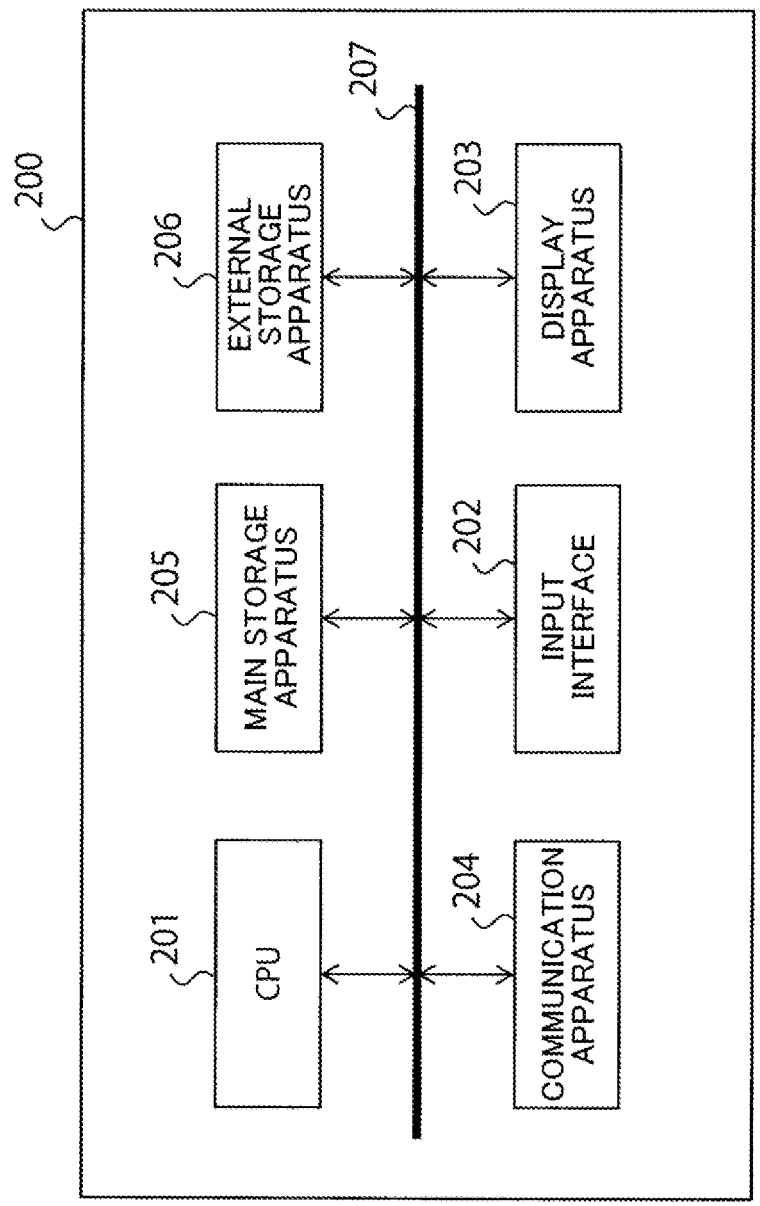
FIG. 12 is a diagram showing an example of a hardware configuration of the information processing apparatus shown in FIG. 1.

FIG. 12 shows an example of a hardware configuration of the information processing apparatus 101 shown in FIG. 1. The information processing apparatus 101 according to the present embodiment is constituted of a computer apparatus 170. The computer apparatus 170 includes a CPU 151, an input interface 152, a display apparatus 153, a communication apparatus 154, a main storage apparatus 155, and an external storage apparatus 156, and the components are connected to each other by a bus 157.

The CPU (central processing unit) 151 executes a computer program that realizes each of the functional components of the information processing apparatus 101 described above on the main storage apparatus 155. The image acquiring portion 11, the recognition processing portion 12, and the output control portion 13 shown in FIG. 1 are realized as the CPU 151 executes the computer program.

The input interface 152 is a circuit for inputting an operation signal from an input apparatus such as a keyboard, a mouse, or a touch panel to the information processing apparatus 101. A portion that provides an input function of an input portion of the information processing apparatus 101 can be constructed on the input interface 152.

The display apparatus 153 displays data or information output from the information processing apparatus 101. Examples of the display apparatus 153 include, but are not limited to, an LCD (liquid crystal display), a CRT (a cathode-ray tube), and a PDP (a plasma display). Data or information output from the computer apparatus 170 can be displayed by the display apparatus 153.

The communication apparatus 154 is a circuit used by the information processing apparatus 101 to communicate with external apparatuses in a wireless or wired manner. Information can be input from an external apparatus via the communication apparatus 154. Information input from the external apparatus can be stored in a DB. A part of or all of the function of the output control portion 13 may be constructed on the communication apparatus 154.

The main storage apparatus 155 stores a program that realizes processing of the present embodiment, data necessary for executing the program, data generated by executing the program, and the like. The program is expanded and executed on the main storage apparatus 155. Examples of the main storage apparatus 155 include, but are not limited to, a RAM, a DRAM, and an SRAM. The storage portion 14 shown in FIG. 1 may be constructed on the main storage apparatus 155.

The external storage apparatus 156 stores the program described above, data necessary for executing the program, data generated by executing the program, and the like. The program and the data are read to the main storage apparatus 155 during processing according to the present embodiment. Examples of the external storage apparatus 156 include, but are not limited to, a hard disk, an optical disk, a flash memory, and a magnetic tape. The storage portion 14 shown in FIG. 1 may be constructed on the external storage apparatus 156.

The program described above may be installed in advance in the computer apparatus 170 or stored in a recording medium such as a CD-ROM. In addition, the program may be uploaded onto the Internet.

The computer apparatus 170 may include one or a plurality of each of the processor 151, the input interface 152, the display apparatus 153, the communication apparatus 154, and the main storage apparatus 155.

In addition, the information processing apparatus 101 may be constituted of a single computer apparatus 170 or configured as a system made up of a plurality of computer apparatuses 170 being connected to each other.

As described above, according to the first embodiment, when the information processing apparatus 101 detects an unknown body object (recognizes an unknown body) or when the information processing apparatus 101 does not detect a recognition target object (does not recognize a recognition target), the information processing apparatus 101 outputs non-recognition notification information. Accordingly, even when a person is present in a periphery of a vehicle, the person can be notified of the fact that the vehicle does not recognize the person. In other words, a warning can be issued to the person. The person can comprehend that he/she is not being recognized by the vehicle and can take action such as moving away from the vehicle or attempting to draw the attention of the vehicle toward the person.

In addition, according to the present embodiment, when a recognition target object is detected (when a recognition target is recognized), the person can be notified of the fact that he/she is recognized by a vehicle by outputting recognition notification information toward the person from the vehicle. Accordingly, the attention of the person can be drawn. Furthermore, learning that the person is being recognized by the vehicle enables the person to walk safely. Moreover, by operating the vehicle by autonomous driving so as not to approach or to stop, the person and persons nearby are safe.

In addition, according to the present embodiment, by differentiating between a parameter of non-recognition notification information and a parameter of recognition notification information, people in a periphery of a vehicle can readily distinguish between being recognized by the vehicle and not being recognized by the vehicle. For example, when a red light is radiated toward a person, the person can understand that he/she is not being recognized, and when a blue light is radiated toward a person, the person can understand that he/she is being recognized.

Second Embodiment

Figure 13:
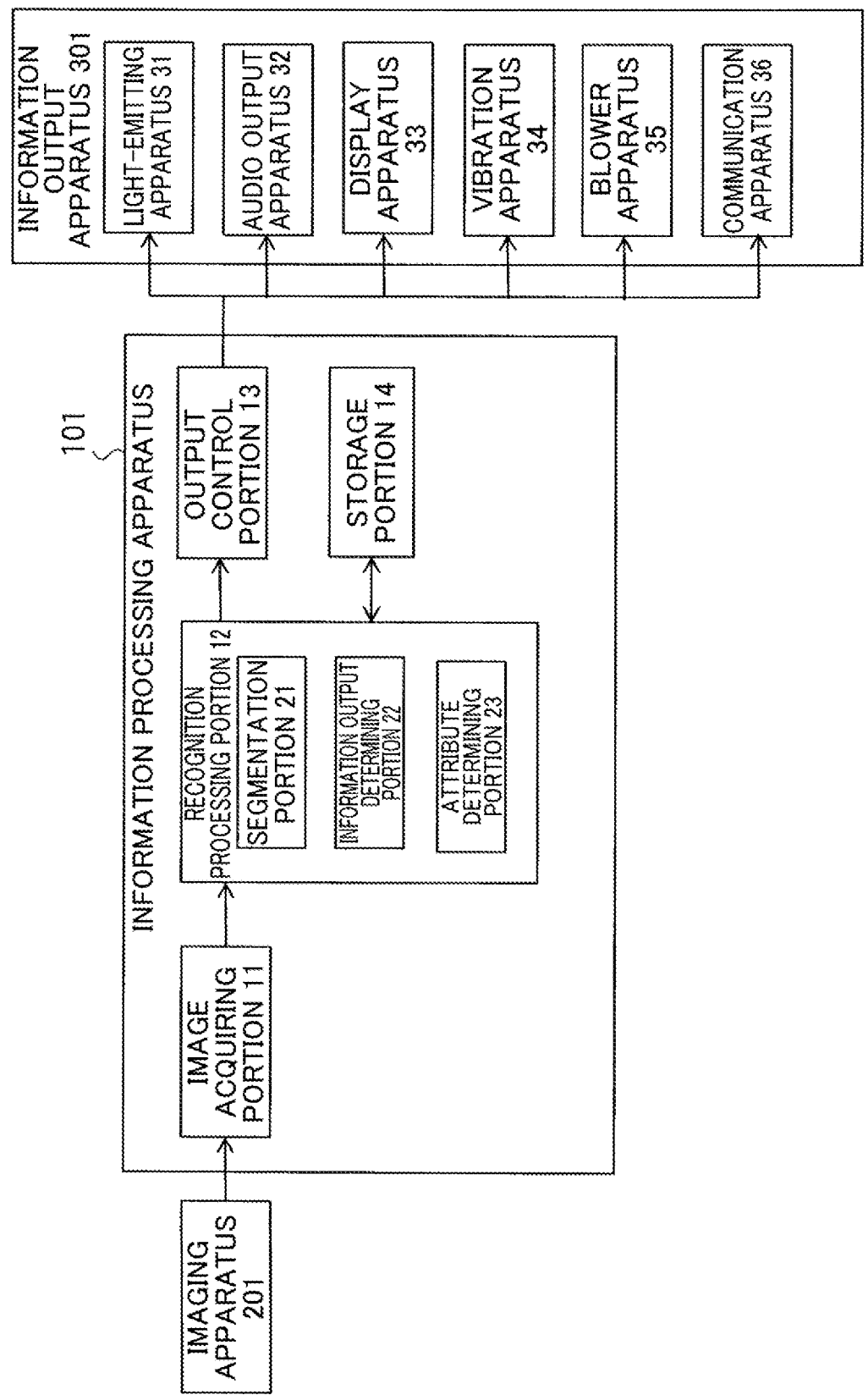
FIG. 13 is a block diagram of a vehicle warning system including an information processing apparatus according to a second embodiment.

FIG. 13 is a block diagram of a vehicle warning system including an information processing apparatus according to a second embodiment. An attribute determining portion 23 has been added to the recognition processing portion 12 shown in FIG. 1.

The attribute determining portion 23 determines an attribute of a recognition target with respect to a recognition target object detected by the segmentation portion 21. As an example, a learned neural network prepared for each attribute in advance is used. For example, a neural network that determines whether or not sunglasses are being worn from an image including a face of a person is learned in advance.

The attribute determining portion 23 extracts an image of a recognition target object detected by the segmentation portion 21 or an image that encloses the recognition target object from image data and uses the extracted image as an input to the neural network. As an output of the neural network, for example, a result of a determination of a presence or absence of sunglasses is obtained. Whether or not sunglasses are being worn is an example of an attribute and there are a variety of other attributes. Examples of other attributes include whether a person is a child or an adult, gender, whether or not visually-impaired, whether or not hearing-impaired, whether or not earphones are being worn, and whether or not a wheelchair is being used. An attribute can also be determined using methods other than a neural network.

The information output determining portion 22 decides at least one of a medium and a parameter for outputting recognition notification information based on an attribute of a recognition target. At least one of the decided medium and the decided parameter is instructed to the output control portion 13.

For example, when a pedestrian as a recognition target is a child, a message that is readily understood by children is used. Specifically, for example, when notifying recognition notification information by audio, a voice message such as "Watch out!" is output in a child's voice. In addition, when a pedestrian is wearing sunglasses, since it is difficult to convey recognition notification information (a warning or the like) by light as a medium, the recognition notification information is output by sound. Furthermore, in the case of a pedestrian who is visually and hearing impaired, recognition notification information is output using vibration or air pressure.

Figure 14:
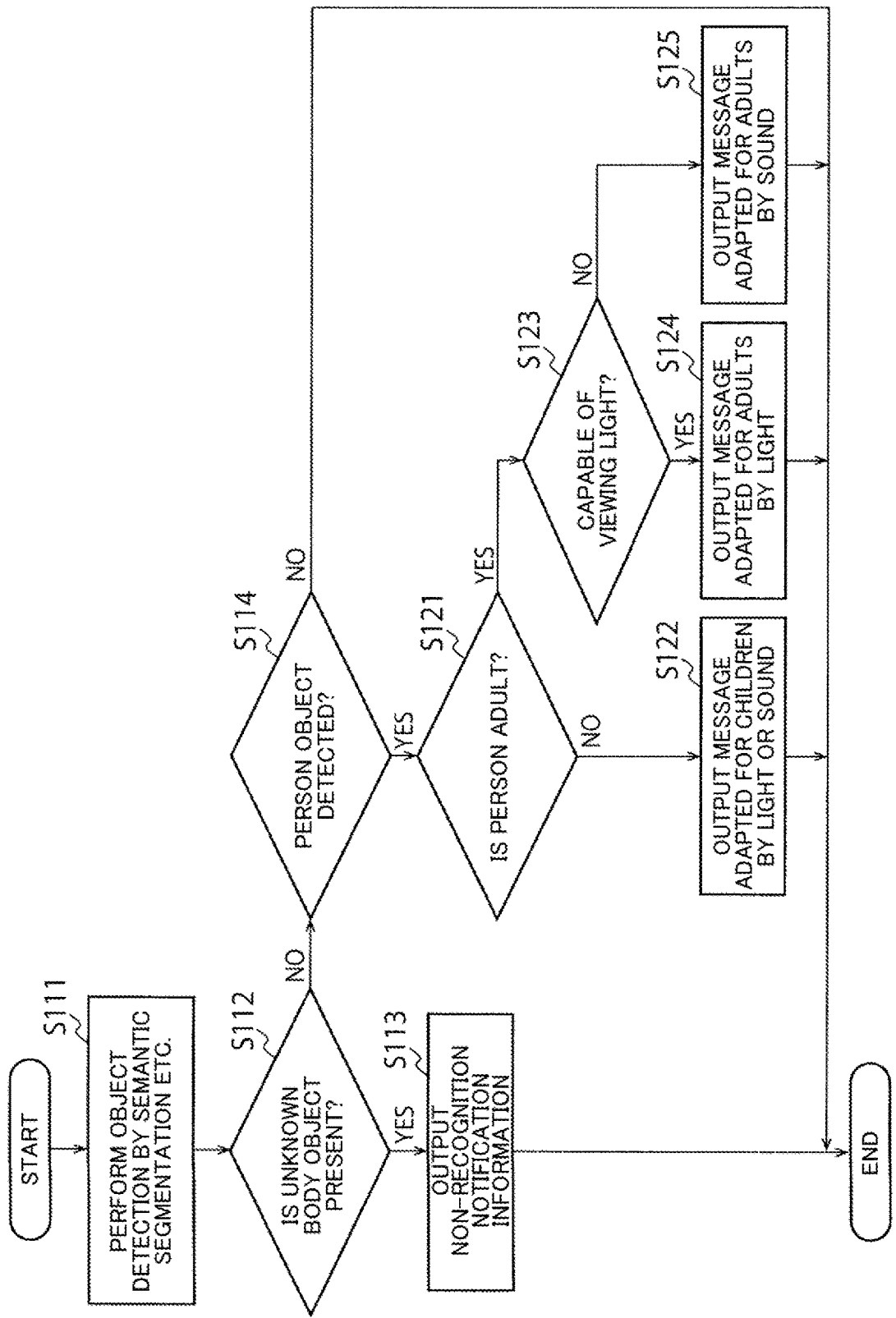
FIG. 14 is a flowchart showing an example of an operation of the information processing apparatus according to the second embodiment.

FIG. 14 is a flowchart showing an example of an operation of the information processing apparatus 101 according to the second embodiment. Steps S121 to S125 have been added to the flow chart (refer to FIG. 11) according to the first embodiment. Since steps S111 to S114 are the same as in FIG. 11, descriptions will be omitted.

When it is determined in step S114 that a person object has been detected (YES in S114), the attribute determining portion 23 determines whether the person is an adult or a child (S121). For example, the determination is made using an image including the detected person object and a neural network that determines whether a person is an adult or not. When the person is determined to be a child (NO in S121), the information output determining portion 22 provides the output control portion 13 with information instructing output of recognition notification information adapted for children. For example, using light or sound, the output control portion 13 outputs a message of which contents have been adapted for children via the information output apparatus 301 (S122). For example, an audio message using simple words is output.

On the other hand, when the person is determined to be an adult (YES in S121), the attribute determining portion 23 determines whether the person is capable of viewing light or in a state where light is readily viewable (S123). For example, the determination can be made using an image including the detected person object and a neural network that determines whether or not sunglasses are being worn. When it is determined that the person is capable of viewing light or in a state where light is readily viewable (YES in S123), the information output determining portion 22 provides the output control portion 13 with information instructing to output recognition notification information adapted for adults capable of viewing light. The output control portion 13 outputs, using light, a message of which contents have been adapted for adults via the information output apparatus 301 (S124). For example, light of a specific color (for example, blue) may be emitted by the light-emitting apparatus 31 or a specific message may be displayed on the display apparatus 33. Displaying a message on the display apparatus 33 is also an example of notifying recognition notification information using light as a medium.

On the other hand, when it is determined that the person is incapable of viewing light or in a state where light is not readily viewable (NO in S123), the information output determining portion 22 provides the output control portion 13 with information instructing to output recognition notification information adapted for adults incapable of viewing light or in a state where light is not readily viewable. For example, the output control portion 13 outputs, using sound, a message of which contents have been adapted for adults via the information output apparatus 301 (S125).

As described above, according to the second embodiment, by modifying a medium or a parameter for outputting recognition notification information in accordance with an attribute of a recognition target, an appropriate communication method can be used in accordance with a state of a recipient. Therefore, the recipient can be more reliably notified of recognition notification information.

Third Embodiment

Figure 15:
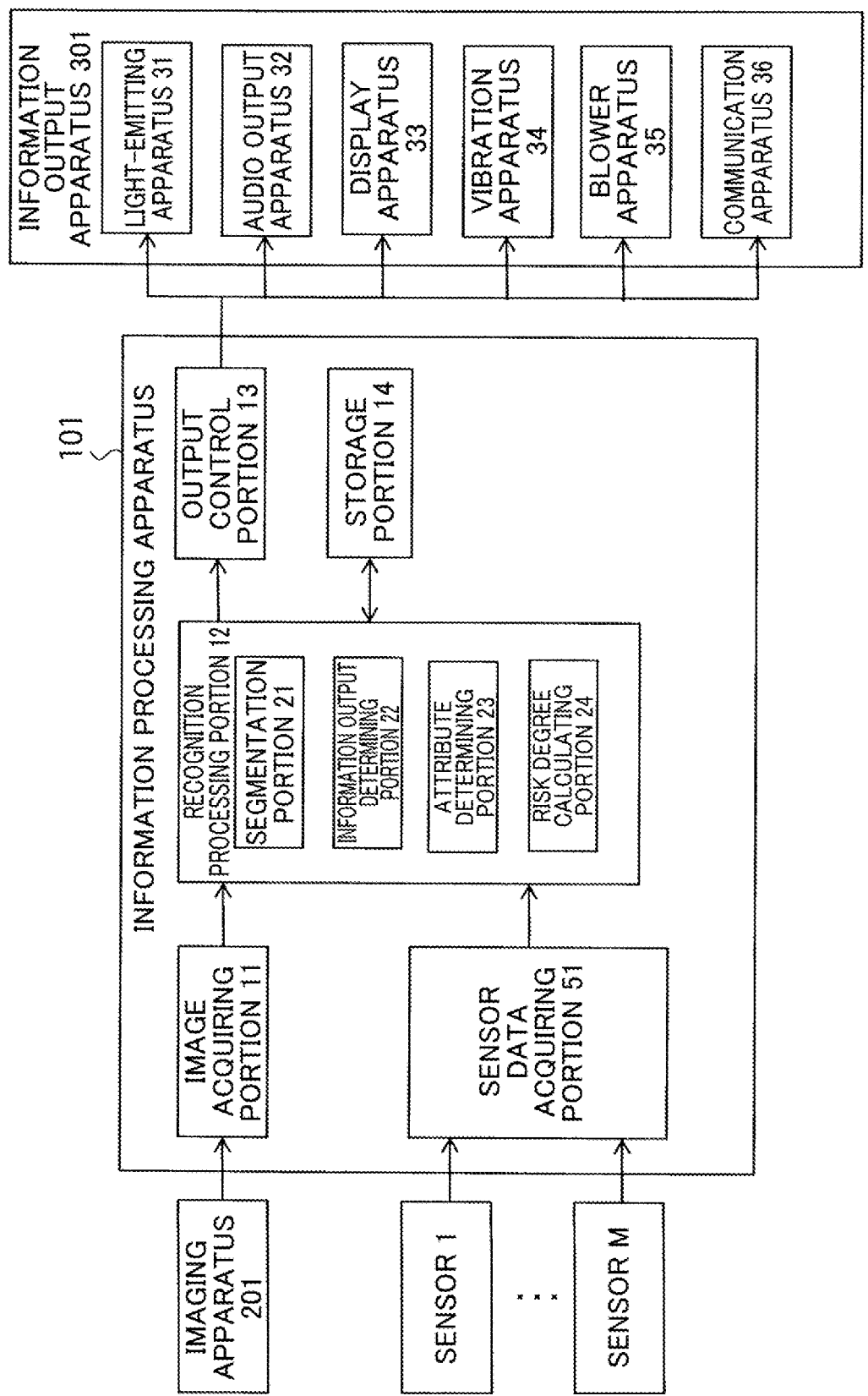
FIG. 15 is a block diagram of a vehicle warning system including an information processing apparatus according to a third embodiment.

FIG. 15 is a block diagram of a vehicle warning system including an information processing apparatus according to a third embodiment. M-number of (where M is an integer of 1 or more) sensors 1 to M are connected to the information processing apparatus 101 in a wired or wireless manner. The information processing apparatus 101 includes a sensor data acquiring portion 51 and a risk degree calculating portion 24. While the block diagram according to the third embodiment represents a configuration in which the sensors 1 to M, the sensor data acquiring portion 51, and the risk degree calculating portion 24 have been added to the block diagram according to the second embodiment, a configuration in which the sensors 1 to M, the sensor data acquiring portion

51, and the risk degree calculating portion 24 have been added to the block diagram according to the first embodiment can also be adopted.

As an example, the sensors 1 to M include sensors of one or more types such as environmental sensors (a rainfall sensor, a fog sensor, a sunshine sensor, a snow sensor, and the like), a distance sensor, an infrared sensor, and a velocity sensor. The sensors may be of types other than those described herein. As an example, the sensors 1 to M detect data at constant sampling intervals and provide the sensor data acquiring portion 51 with the detected data.

As a data acquiring portion, the sensor data acquiring portion 51 acquires data detected by the sensors 1 to M.

The risk degree calculating portion 24 calculates a degree of risk based on at least one of data of the sensors 1 to M and a recognition score with respect to a target (an unknown body) represented by a detected unknown body object. A degree of risk is a value that evaluates, when an unknown body is assumed to be a person, a degree of a possibility that the person is not aware of the vehicle or a possibility that the person will collide with the vehicle. For example, a state of the unknown body is specified based on the sensors 1 to M and a degree of risk is calculated based on the specified state.

For example, a value of the degree of risk is calculated in accordance with a distance between the vehicle and the unknown body. For example, a value of the degree of risk is calculated such that the shorter the distance, the higher the value. As an example, a distance to the unknown body can be acquired using a distance sensor. Alternatively, when the imaging apparatus 201 is a stereo camera, the distance to the unknown body may be acquired based on an image captured by the stereo camera. In addition, when the distance between the vehicle and the unknown body is shorter than a threshold, the value of the degree of risk may be set higher than when the distance is equal to or longer than the threshold.

In addition, a value of the degree of risk is calculated in accordance with a movement speed of the unknown body object. For example, the value of the degree of risk is calculated such that the higher the movement speed, the higher the value. As an example, the movement speed of the unknown body object can be acquired using a velocity sensor. In addition, the value of the degree of risk is calculated in accordance with a movement direction of the unknown body object. For example, the value of the degree of risk is calculated such that the closer the movement direction is to the vehicle, the higher the value.

Furthermore, a value of the degree of risk may be set such that the lower the recognition score of the unknown body object, the higher the value.

The information output determining portion 22 modifies a parameter or a medium of non-recognition notification information in accordance with the calculated degree of risk. For example, when using the audio output apparatus 32, the higher the degree of risk, the larger a volume of output, the faster a speed of voice, or the sterner the wording of a voice message.

In addition, when the degree of risk is high, the number of notification units to be used among the notification units 31 to 36 may be increased. For example, when the degree of risk is equal to or higher than a threshold, non-recognition notification information may be output using all notification units.

As described above, the information output determining portion 22 decides a parameter or a medium of non-recognition notification information based on a state of an unknown body such as a movement speed of the unknown body, a movement direction of the unknown body, or a distance between the unknown body and a vehicle.

With respect to a detected recognition target object, the risk degree calculating portion 24 calculates a degree of risk based on at least one of data of the sensors 1 to M, a recognition score, and a determination result of the attribute determining portion 23. For example, a state of a recognized object is specified based on at least one of the sensors 1 to M and a determination result of the attribute determining portion 23 and a degree of risk is calculated based on the specified state. As an example, the state of a recognition target includes a state related to the five senses (sense of vision, sense of hearing, sense of touch, sense of smell, and sense of taste) of the recognition target. In addition, as another example, the state of the recognition target includes a distance to a vehicle, a movement speed, and a direction in which the recognition target is facing.

For example, a degree of risk is increased when a detected person (recognition target) is facing a side opposite to the vehicle or wearing sunglasses on the assumption that the recognition target is not aware of the vehicle. Whether or not the recognition target is facing a side opposite to the vehicle or whether or not the recognition target is wearing sunglasses can be determined by the attribute determining portion 23 by a method using the neural network described earlier.

In addition, when a movement speed of the recognition target is low, a degree of risk may be reduced by determining that the vehicle is recognizing the recognition target and a risk of a collision is low. Conversely, when a movement speed of the recognition target is high, a degree of risk may be increased by determining that there is a possibility that the vehicle will collide with the recognition target even though the vehicle recognizes the recognition target.

Furthermore, when the recognition score is equal to or higher than a certain value, a degree of risk may be reduced on the assumption that the possibility that the recognition target is aware of the vehicle is sufficiently high.

The information output determining portion 22 modifies the parameter or the medium of the recognition notification information in accordance with the calculated degree of risk. For example, when using the light-emitting apparatus 31, the higher the degree of risk, the higher the blink rate of light. In addition, when the degree of risk is high, the number of notification units to be used among the notification units 31 to 36 may be increased. For example, when the degree of risk is equal to or higher than a threshold, recognition notification information may be output using all notification units. In addition, when the degree of risk is lower than a certain value, recognition notification information may be output using only one of the notification units 31 to 36 on the assumption that a risk of colliding with a recognition target is low.

As described above, the information output determining portion 22 decides a parameter or a medium of non-recognition notification information based on a state of a recognition target.

The calculation examples of degrees of risk and the modifications in parameters are merely examples and other methods may be used.

Figure 16:
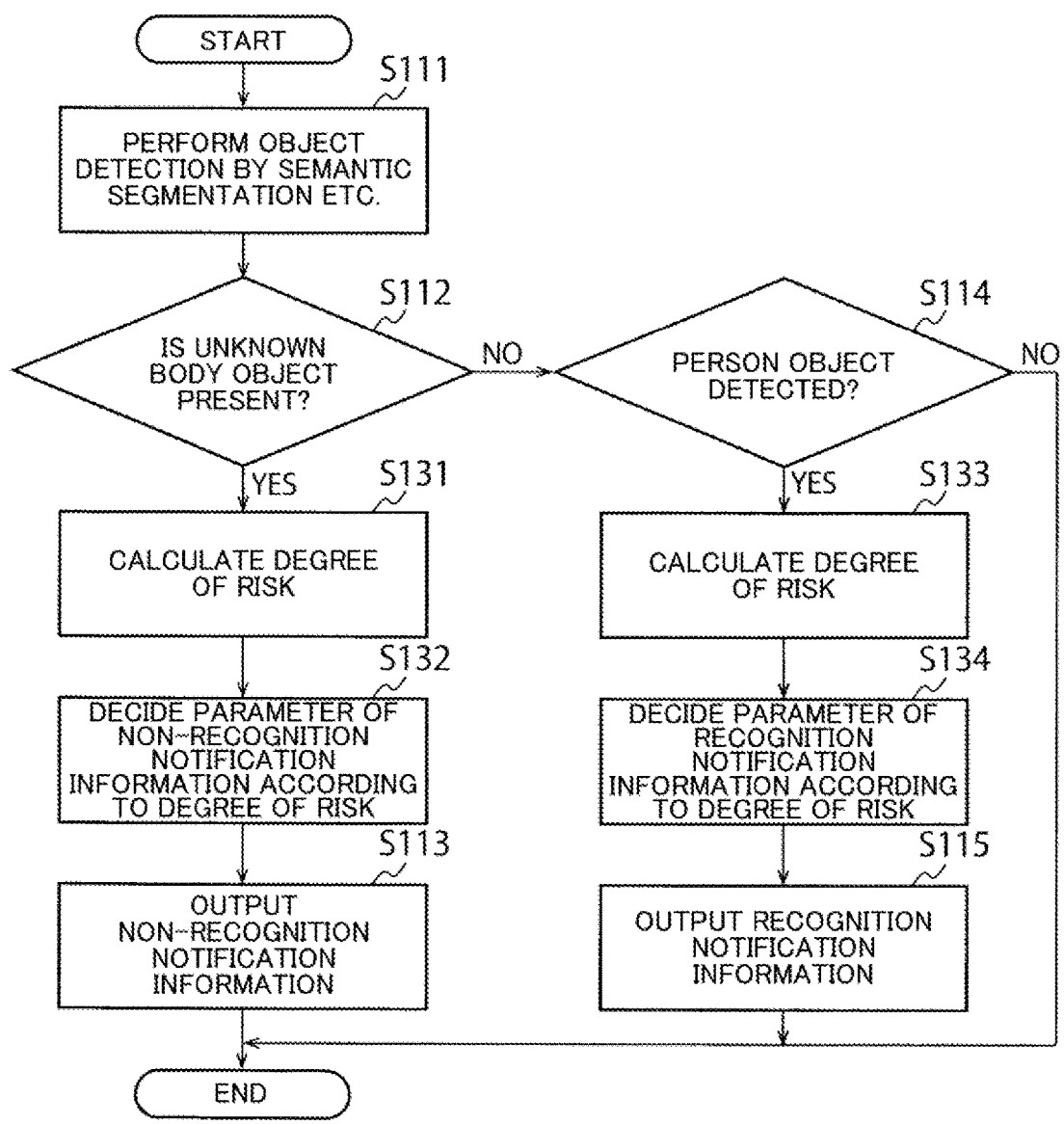
FIG. 16 is a flowchart showing an example of an operation of the information processing apparatus according to the third embodiment.

FIG. 16 is a flowchart showing an example of operations of the information processing apparatus 101 according to the third embodiment. Steps S131 to S134 have been added to the flow chart (refer to FIG. 11) according to the first embodiment. Since steps S111 to S115 are the same as in FIG. 11, descriptions will be omitted. Note that steps S131 to S134 can also be added to the flow chart (refer to FIG. 14) according to the second embodiment.

When an unknown body object is detected in step S112, the risk degree calculating portion 24 calculates a degree of risk with respect to an unknown body (S131). Based on the calculated degree of risk, the information output determining portion 22 decides a parameter of non-recognition notification information (S132) and provides the output control portion 13 with instruction information for outputting non-recognition notification information with the decided parameter. The output control portion 13 causes the information output apparatus 301 to output non-recognition notification information in accordance with the instruction information (S113).

When it is determined in step S114 that a recognition target object has been detected (YES in S114), the risk degree calculating portion 24 calculates a degree of risk with respect to a recognition target (S133). The information output determining portion 22 decides a parameter of recognition notification information based on the calculated degree of risk (S134) and provides the output control portion 13 with instruction information for outputting recognition notification information with the decided parameter. The output control portion 13 causes the information output apparatus 301 to output recognition notification information in accordance with the instruction information (S115).

As described above, according to the third embodiment, a degree of risk of an unknown body is calculated and a parameter of non-recognition notification information is decided in accordance with the calculated degree of risk. Accordingly, when the unknown body is a person, non-recognition notification information can be notified in a suitable mode in accordance with a state of the person. In addition, according to the third embodiment, a degree of risk of a recognition target object is calculated and a parameter of recognition notification information is decided in accordance with the calculated degree of risk. Accordingly, non-recognition notification information can be notified in a suitable mode in accordance with a state of the recognition target.

Fourth Embodiment

Figure 17:
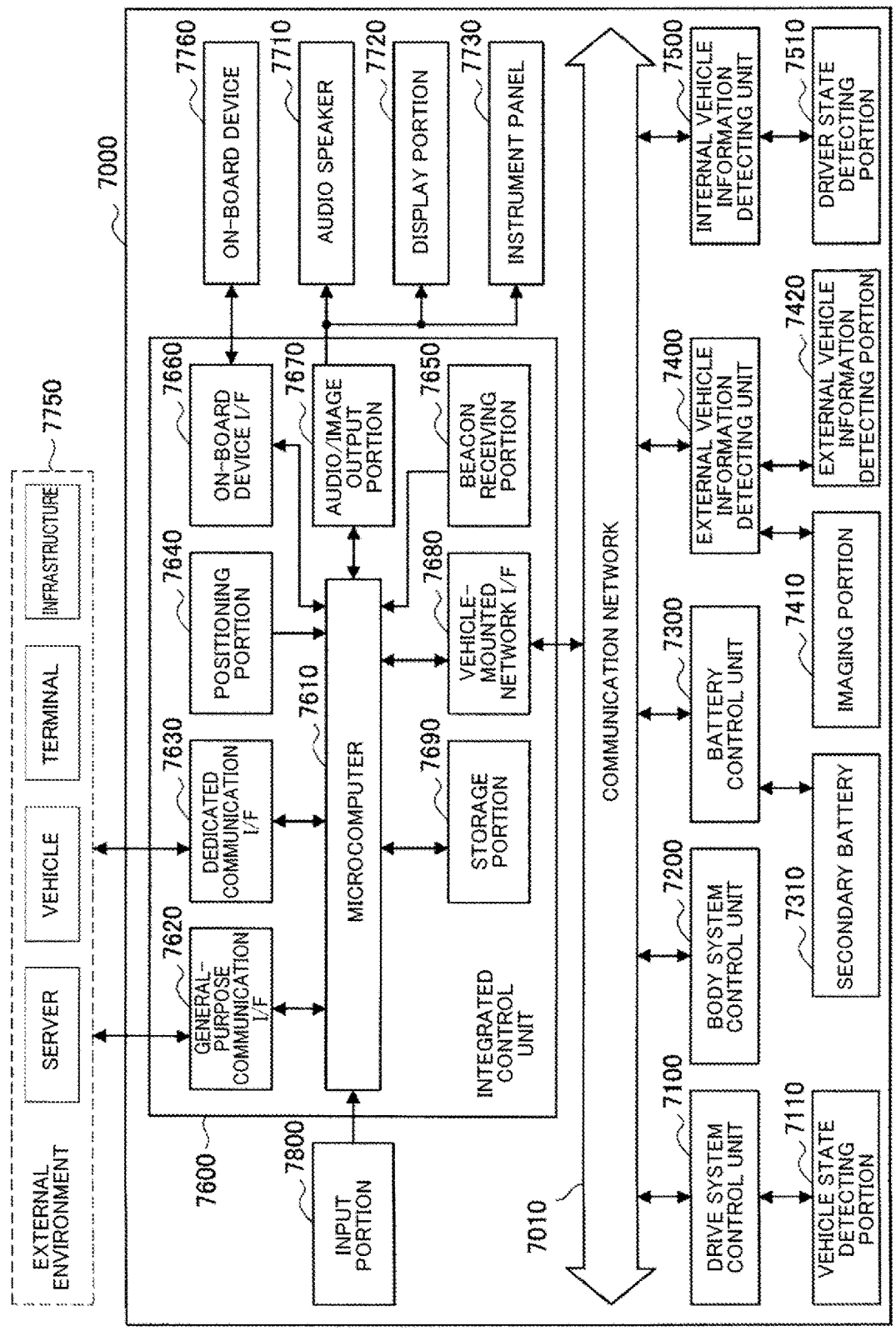
FIG. 17 is a block diagram showing a schematic configuration example of a vehicle control system.

FIG. 17 is a block diagram showing a schematic configuration example of a vehicle control system 7000 which is an example of a moving body control system to which the technique according to the present disclosure can be applied. The vehicle control system 7000 includes a plurality of electronic control units connected via a communication network 7010. In the example shown in FIG. 17, the vehicle control system 7000 includes a drive system control unit 7100, a body system control unit 7200, a battery control unit 7300, an external vehicle information detecting unit 7400, an internal vehicle information detecting unit 7500, and an integrated control unit 7600. The communication network 7010 connecting the plurality of control units may be an in-vehicle communication network conforming to any standard such as a CAN (Controller Area Network), a LIN (Local Interconnect Network), a LAN (Local Area Network), or FlexRay (registered trademark).

Each control unit includes a microcomputer that performs arithmetic processing according to various programs, a storage portion that stores programs executed by the microcomputer, parameters used for various arithmetic operations, and the like, and a drive circuit that drives various control target apparatuses. Each control unit includes a network I/F for communicating with other control units via the communication network 7010, and includes a communication I/F for communicating through wired communication or wireless communication with apparatuses, sensors, or the like inside or outside the vehicle. In FIG. 17, a microcomputer 7610, a general-purpose communication I/F 7620, a dedicated communication I/F 7630, a positioning portion 7640, a beacon receiving portion 7650, an on-board device I/F 7660, an audio/image output portion 7670, a vehicle-mounted network I/F 7680, and a storage portion 7690 are shown as functional components of the integrated control unit 7600. Other control units also include a microcomputer, a communication I/F, a storage portion, and the like.

The drive system control unit 7100 controls an operation of an apparatus related to a drive system of a vehicle according to various programs. For example, the drive system control unit 7100 functions as a control apparatus for a driving force generation apparatus for generating driving force for the vehicle, such as an internal combustion engine or a drive motor, a driving force transmission mechanism for transmitting the driving force to wheels, a steering mechanism for adjusting a steering angle of the vehicle, a braking apparatus that generates braking force for the vehicle, and the like. The drive system control unit 7100 may have a function of a control apparatus of an ABS (Antilock Brake System), an ESC (Electronic Stability Control), or the like.

A vehicle state detecting portion 7110 is connected to the drive system control unit 7100. The vehicle state detecting portion 7110 includes, for example, at least one of a gyro sensor that detects an angular velocity of an axial rotation motion of a vehicle body, an acceleration sensor that detects an acceleration of a vehicle, and sensors for detecting an amount of operation with respect to an accelerator pedal, an amount of operation with respect to a brake pedal, a steering angle of a steering wheel, an engine speed, a rotation speed of wheels, and the like. The drive system control unit 7100 performs arithmetic processing using a signal input from the vehicle state detecting portion 7110 to control an internal combustion engine, a drive motor, an electric power steering apparatus, a brake apparatus, and the like.

The body system control unit 7200 controls operations of various apparatuses equipped in the vehicle body in accordance with various programs. For example, the body system control unit 7200 functions as a control apparatus of a keyless entry system, a smart key system, a power window apparatus, or various lamps such as a head lamp, a back lamp, a brake lamp, a turn indicator, and a fog lamp. In this case, radio waves emitted from a portable device that substitutes as a key or signals of various switches can be input to the body system control unit 7200. The body system control unit 7200 receives inputs of the radio waves or signals and controls a door lock apparatus, a power window apparatus, lamps, and the like of the vehicle.

The battery control unit 7300 controls a secondary battery 7310 which is a power supply source of a driving motor in accordance with various programs. For example, information such as a battery temperature, a battery output voltage, or a remaining capacity of a battery is input from a battery apparatus including the secondary battery 7310 to the battery control unit 7300. The battery control unit 7300 performs arithmetic processing using such a signal and performs temperature adjustment control of the secondary battery 7310 or control of a cooling apparatus equipped in the battery apparatus.

The external vehicle information detecting unit 7400 detects external information of a vehicle on which the vehicle control system 7000 is mounted. For example, at least one of an imaging portion 7410 and an external vehicle information detecting portion 7420 is connected to the external vehicle information detecting unit 7400. The imaging portion 7410 includes at least one of a ToF (Time of Flight) camera, a stereo camera, a monocular camera, an infrared camera, and other cameras. The external vehicle information detecting portion 7420 includes, for example, at least one of an environmental sensor for detecting current weather, or a surroundings information detection sensor for detecting other vehicles, obstacles, pedestrians, or the like around the vehicle in which the vehicle control system 7000 has been mounted.

The environmental sensor may be, for example, at least one of a raindrop sensor that detects rainy weather, a fog sensor that detects fog, a sunshine sensor that detects a degree of sunshine, and a snow sensor that detects snowfall. The surroundings information detection sensor may be at least one of an ultrasonic sensor, a radar apparatus, and a LIDAR (Light Detection and Ranging or Laser Imaging Detection and Ranging) apparatus. The imaging portion 7410 and the external vehicle information detecting portion 7420 may be included as independent sensors or apparatuses or may be included as an apparatus in which a plurality of sensors or apparatuses are integrated.

Figure 18:
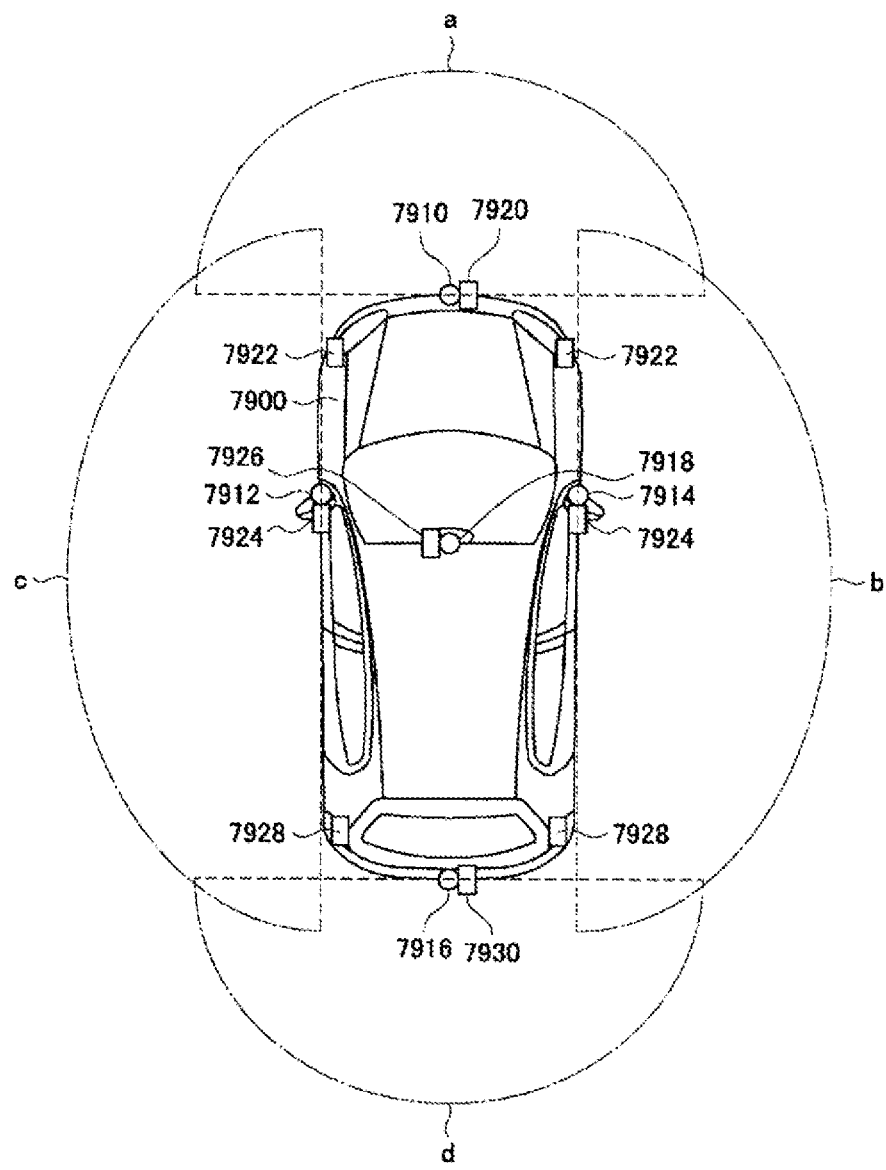
FIG. 18 is a diagram showing an example of installation positions of an imaging portion and an external vehicle information detecting portion.

FIG. 18 shows an example of installation positions of the imaging portion 7410 and the external vehicle information detecting portion 7420. Imaging portions 7910, 7912, 7914, 7916, and 7918 are provided, for example, at at least one of a front nose, a side mirror, a rear bumper, a back door, and an upper part of a windshield in a vehicle cabin of a vehicle 7900. The imaging portion 7910 included at the front nose and the imaging portion 7918 included in the upper part of the windshield in the vehicle cabin mainly acquire an image of front of the vehicle 7900. The imaging portions 7912 and 7914 provided at the side mirrors mainly acquire images of the side of the vehicle 7900. The imaging portion 7916 provided in the rear bumper or the back door mainly acquires an image of the rear of the vehicle 7900. The imaging portion 7918 provided at the upper part of the windshield in the vehicle cabin is mainly used for detection of a preceding vehicle, a pedestrian, an obstacle, a traffic light, a traffic sign, a lane, or the like.

In FIG. 18, an example of photographing ranges of the respective imaging portions 7910, 7912, 7914, and 7916 is shown. An imaging range a indicates an imaging range of the imaging portion 7910 provided on the front nose, imaging ranges b and c indicate imaging ranges of the imaging portions 7912 and 7914 provided on the side mirrors, and an imaging range d indicates an imaging range of the imaging portion 7916 provided on the rear bumper or the back door. For example, a bird's-eye view image of the vehicle 7900 as viewed from above can be obtained by superimposing pieces of image data captured by the imaging portions 7910, 7912, 7914, and 7916.

External vehicle information detecting portions 7920, 7922, 7924, 7926, 7928, and 7930 provided in a front, a rear, a side, a corner, and an upper part of the windshield in the vehicle cabin of the vehicle 7900 may be, for example, ultrasonic sensors or radar apparatuses. The external vehicle information detecting portions 7920, 7926, and 7930 provided at the front nose, the rear bumper, the back door, and the upper part of the windshield in the vehicle cabin of the vehicle 7900 may be, for example, LIDAR apparatuses. These external vehicle information detecting portions 7920 to 7930 are mainly used for detection of a preceding vehicle, a pedestrian, an obstacle, or the like.

The description will be continued with reference to FIG. 17 again. The external vehicle information detecting unit 7400 causes the imaging portion 7410 to capture an image of the outside of the vehicle and receives the captured image data. Further, the external vehicle information detecting unit 7400 receives data detected by the connected external vehicle information detecting portion 7420. When the external vehicle information detecting portion 7420 is an ultrasonic sensor, a radar apparatus, or a LIDAR apparatus, the external vehicle information detecting unit 7400 causes ultrasonic waves, electromagnetic waves, or the like to be transmitted, and receives information on the received reflected waves. Based on the received information, the external vehicle information detecting unit 7400 may perform processing of detecting an object such as a person, a vehicle, an obstacle, a sign, or a character on a road surface or processing of detecting a distance to an object outside of a vehicle. The external vehicle information detecting unit 7400 may perform environment recognition processing for recognizing rainfall, fog, a road surface condition, or the like on the basis of the received information. The external vehicle information detecting unit 7400 may calculate a distance to an object outside the vehicle on the basis of the received information.

Furthermore, based on received image data, the external vehicle information detecting unit 7400 may perform processing of recognizing a person, a vehicle, an obstacle, a sign, or a character on a road surface or processing of detecting a distance to an object outside of a vehicle. The external vehicle information detecting unit 7400 may perform processing such as distortion correction or alignment on the received image data, and combine image data captured by the different imaging portions 7410 to generate a bird's-eye view image or a panoramic image. The external vehicle information detecting unit 7400 may perform viewpoint conversion processing using the pieces of image data captured by the different imaging portions 7410.

The internal vehicle information detecting unit 7500 detects internal vehicle information. For example, a driver state detecting portion 7510 that detects a driver's state is connected to the internal vehicle information detecting unit 7500. The driver state detecting portion 7510 may include a camera that images a driver, a biological sensor that detects biological information of the driver, or a microphone that collects a sound in the vehicle cabin. The biological sensor is provided on, for example, a seat surface, a steering wheel, or the like and detects biological information of an occupant sitting on the seat or the driver holding the steering wheel. The internal vehicle information detecting unit 7500 may calculate a degree of fatigue or a degree of concentration of the driver or determine whether or not the driver is asleep on the basis of recognition notification information input from the driver state detecting portion 7510. The internal vehicle information detecting unit 7500 may perform processing such as noise cancellation processing on collected audio signals.

The integrated control unit 7600 controls an overall operation in the vehicle control system 7000 according to various programs. An input portion 7800 is connected to the integrated control unit 7600. The input portion 7800 is realized by an apparatus such as a touch panel, a button, a microphone, a switch, or a lever on which an input operation can be performed by an occupant. Data obtained by recognizing a sound input by the microphone may be input to the integrated control unit 7600. The input portion 7800 may be, for example, a remote control apparatus which uses infrared rays or other radio waves or may be an externally connected device such as a mobile phone or a PDA (Personal Digital Assistant) that supports an operation with respect to the vehicle control system 7000. The input portion 7800 may be, for example, a camera and, in this case, an occupant can input information through gesture. Alternatively, data obtained by detecting a motion of a wearable apparatus worn by the occupant may be input. Further, the input portion 7800 may include, for example, an input control circuit that generates an input signal on the basis of information input by the occupant or the like using the input portion 7800 described above and outputs the input signal to the integrated control unit 7600. The occupant or the like inputs various types of data to the vehicle control system 7000 or instructs a processing operation by operating the input portion 7800.

The storage portion 7690 may include a ROM (Read Only Memory) that stores various programs that are executed by the microcomputer and a RAM (Random Access Memory) that stores various parameters, calculation results, sensor values, and the like. Further, the storage portion 7690 may be realized by a magnetic storage device such as an HDD (Hard Disk Drive), a semiconductor storage device, an optical storage device, or an optical magnetic storage device.

The general-purpose communication I/F 7620 is a general-purpose communication I/F that mediates communication with various devices present in an external environment 7750. The general-purpose communication I/F 7620 may have, implemented therein, a cellular communication protocol such as GSM (registered trademark: Global System of Mobile communications), WiMAX (registered trademark), LTE (registered trademark: Long Term Evolution), or LTE-A (LTE-Advanced), or other wireless communication protocols such as wireless LAN (also referred to as Wi-Fi (registered trademark)) or Bluetooth (registered trademark). The general-purpose communication I/F 7620 may connect to, for example, a device (for example, an application server or a control server) present on an external network (for example, the Internet, a cloud network, or a business-specific network) via a base station or an access point. Further, the general-purpose communication I/F 7620 may connect to a terminal present near the vehicle (for example, a terminal of a driver, a pedestrian, a store, or a MTC (Machine Type Communication) terminal) using, for example, P2P (Peer To Peer) technology.

The dedicated communication I/F 7630 is a communication I/F that supports a communication protocol designed for use in vehicles. In the dedicated communication I/F 7630, for example, WAVE (Wireless Access in Vehicle Environment) being a combination of IEEE 802.11p of a lower layer and IEEE 1609 of an upper layer, DSRC (Dedicated Short Range Communications), or a standard protocol such as a cellular communication protocol may be implemented. The dedicated communication I/F 7630 typically performs V2X communication, which is a concept that includes one or more of vehicle-to-vehicle communication, vehicle-to-infrastructure communication, vehicle-to-home communication, and vehicle-to-pedestrian communication.

The positioning portion 7640 receives, for example, a GNSS (Global Navigation Satellite System) signal from a GNSS satellite (for example, a GPS (Global Positioning System) signal from a GPS satellite), executes positioning, and generates position information including a latitude, longitude, and altitude of the vehicle. The positioning portion 7640 may specify a current position by exchanging signals with a wireless access point, or may acquire position information from a terminal such as a mobile phone, a PHS, or a smartphone having a positioning function.

The beacon receiving portion 7650 receives radio waves or electromagnetic waves transmitted from a wireless station or the like installed on a road, and acquires information such as a current position, traffic jam, no thoroughfare, or required time. A function of the beacon receiving portion 7650 may be included in the above-described dedicated communication I/F 7630.

The on-board device I/F 7660 is a communication interface that mediates a connection between the microcomputer 7610 and various on-board devices 7760 present in the vehicle. The on-board device I/F 7660 may establish a wireless connection using a wireless communication protocol such as wireless LAN, Bluetooth (registered trademark), NFC (Near Field Communication), or WUSB (Wireless USB). Further, the on-board device I/F 7660 may establish a wired connection such as a USB (Universal Serial Bus), HDMI (registered trademark) (High-Definition Multimedia Interface), or MHL (Mobile High-definition Link) via a connection terminal (not illustrated) (and a cable if necessary). The on-board device 7760 may include, for example, at least one of a mobile device or a wearable device of an occupant and an information device carried in or attached to the vehicle. Further, the on-board device 7760 may include a navigation apparatus that searches for a route to an arbitrary destination. The on-board device I/F 7660 exchanges control signals or data signals with the on-board devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning portion 7640, the beacon receiving portion 7650, the on-board device I/F 7660, and the vehicle-mounted network I/F 7680. For example, the microcomputer 7610 may calculate a control target value of the driving force generation apparatus, the steering mechanism, or the braking apparatus on the basis of the acquired information inside and outside the vehicle, and output a control command to the drive system control unit 7100. For example, the microcomputer 7610 may perform cooperative control for the purpose of realization of functions of an ADAS (Advanced Driver Assistance System) including vehicle collision avoidance or impact mitigation, car-following driving based on an inter-vehicle distance, constant-speed driving, vehicle collision warning, vehicle lane deviation warning, and the like. Further, the microcomputer 7610 may perform cooperative control for the purpose of, for example, automated driving in which a vehicle travels autonomously without relying on an operation of the driver, by controlling the driving force generation apparatus, the steering mechanism, the braking apparatus, or the like on the basis of acquired information on the surroundings of the vehicle.

The microcomputer 7610 may generate three-dimensional distance information between the vehicle and bodies such as surrounding structures or people based on information acquired via at least one of the general-purpose communication I/F 7620, the dedicated communication I/F 7630, the positioning portion 7640, the beacon receiving portion 7650, the on-board device I/F 7660, and the vehicle-mounted network I/F 7680 and may generate local map information including information on surroundings of a present position of the vehicle.

The audio/image output portion 7670 transmits an output signal of at least one of audio and an image to an output apparatus capable of visually or auditorily notifying an occupant or the outside of the vehicle of information. In the example of FIG. 17, an audio speaker 7710, a display portion 7720, and an instrument panel 7730 are exemplified as the output apparatus. The display portion 7720 may include at least one of, for example, an onboard display and a head-up display. The display portion 7720 may have an AR (Augmented Reality) display function. The output apparatus may be apparatuses other than the above such as a wearable device such as a headphone or a spectacle-type display worn by an occupant, a projector, or a lamp. When the output apparatus is a display apparatus, the display apparatus visually displays results obtained through various types of processing performed by the microcomputer 7610 or information received from other control units in various formats such as a text, an image, a table, and a graph. When the output apparatus is an audio output apparatus, the audio output apparatus converts an audio signal formed by reproduced sound data, acoustic data, or the like into an analog signal and outputs the analog signal auditorially.

In the example shown in FIG. 17, at least two control units connected via the communication network 7010 may be integrated as one control unit. Alternatively, each control unit may be constituted by a plurality of control units. Further, the vehicle control system 7000 may include other control units (not illustrated). Moreover, in the above description, a part of or all of the functions performed by any of the control units may be performed by another control unit. That is, predetermined calculation processing may be performed by any one of the control units as long as information is transmitted and received via the communication network 7010. Similarly, a sensor or apparatus connected to any one of the control units may be connected to another control unit, and a plurality of control units may transmit or receive recognition notification information to and from each other via the communication network 7010.

A computer program for realizing each function of the information processing apparatus 101 described with reference to FIGS. 1, 13, and 15 can be mounted to any of the control units or the like. Further, it is also possible to provide a computer-readable recording medium in which such a computer program has been stored. The recording medium is, for example, a magnetic disk, an optical disc, a magneto-optical disc, or a flash memory. Further, the above computer program may be distributed via, for example, a network without using the recording medium.

In the vehicle control system 7000 described above, the information processing apparatus 101 described with reference to FIGS. 1, 13, and 15 can be applied to the integrated control unit 7600 of the application example shown in FIG. 17. For example, the image acquiring portion 11 of the information processing apparatus 101 corresponds to the vehicle-mounted network I/F 7680 of the integrated control unit 7600 or to the external vehicle information detecting unit 7400. For example, the recognition processing portion 12 of the information processing apparatus 101 corresponds to the microcomputer 7610. For example, the output control portion 13 of the information processing apparatus 101 corresponds to the audio/image output portion 7670, the general-purpose communication I/F 7620, or the dedicated communication I/F 7630. For example, the storage portion 14 of the information processing apparatus 101 corresponds to the storage portion 7690. In addition, for example, the imaging apparatus 201 shown in FIG. 1 corresponds to the imaging portion 7410 and the sensors 1 to M shown in FIG. 15 correspond to the external vehicle information detecting portions 7420.

Further, at least some of the components of the information processing apparatus 101 described with reference to FIGS. 1, 13, and 15 may be realized in a module for the integrated control unit 7600 shown in FIG. 17 (for example, an integrated circuit module constituted of one die). Alternatively, the information processing apparatus 101 described with reference to FIGS. 1, 13, and 15 may be realized by the plurality of control units of the vehicle control system 7000 shown in FIG. 17.

It is to be understood that the embodiments described above merely represent examples embodying the present disclosure and that the present disclosure can be implemented in various other modes. For example, various modifications, replacements, omissions, or combinations thereof can be made without departing from the spirit and scope of the present disclosure. Modes representing such modifications, replacements, omissions, and the like also fall within the scope of the present disclosure as well as the scopes of the invention as set forth in the scope of claims and equivalents thereof.

In addition, the advantageous effects of the present disclosure as described in the present specification are merely exemplary and other advantageous effects may be produced.

The present disclosure may be configured as follows.

[Item 1]

An information processing apparatus, including; a recognition processing portion configured to perform recognition processing of a recognition target based on a captured image of a surrounding environment of a mobile body; and
    an output control portion configured to cause, when the recognition target is not recognized, an output apparatus to output non-recognition notification information indicating that the recognition target is not recognized.

[Item 2]

The information processing apparatus according to item 1, wherein the recognition processing portion is configured to perform object detection based on the captured image, and
    the output control portion is configured to cause the output apparatus to output the non-recognition notification information when an object of the recognition target is not detected.

[Item 3]

The information processing apparatus according to item 2, wherein the output control portion is configured to output the non-recognition notification information when an object of which type is unknown is detected by the recognition processing portion.

[Item 4]

The information processing apparatus according to item 3, wherein the object is an object of which a recognition score is lower than a threshold.

[Item 5]

The information processing apparatus according to item 3, wherein the recognition processing portion is configured to identify a state of a target represented by the object, and
    the output control portion is configured to cause the output apparatus to output the non-recognition notification information using a medium in accordance with a state of the target.

[Item 6]

The information processing apparatus according to item 5, wherein the medium includes at least one of light, sound, vibration, air, and radio waves.

[Item 7]
The information processing apparatus according to item 3, wherein the output control portion is configured to modify a parameter of the non-recognition notification information in accordance with a value of a recognition score of the object.

[Item 8]
The information processing apparatus according to item 3, wherein the recognition processing portion is configured to identify a state of a target represented by the object, and
the output control portion is configured to modify a parameter of the non-recognition notification information in accordance with a state of the target.

[Item 9]
The information processing apparatus according to item 8, wherein a state of the target includes at least one of a movement speed of the target, a movement direction of the target, and a distance from the mobile body.

[Item 10]
The information processing apparatus according to item 3, wherein the recognition processing portion is configured to calculate a degree of risk of a target represented by the object, and
the output control portion is configured to modify a parameter of the non-recognition notification information in accordance with the degree of risk.

[Item 11]
The information processing apparatus according to item 1, wherein the output control portion is configured to cause, when the recognition target is recognized, the output apparatus to output recognition notification information indicating that the recognition target is recognized.

[Item 12]
The information processing apparatus according to item 11, wherein the recognition processing portion is configured to perform object detection based on the captured image, and
the output control portion is configured to cause the output apparatus to output the recognition notification information when an object of the recognition target is detected.

[Item 13]
The information processing apparatus according to item 11, wherein the recognition processing portion is configured to identify a state or an attribute of the recognition target, and
the output control portion is configured to cause the output apparatus to output the recognition notification information using a medium in accordance with the state or the attribute of the recognition target.

[Item 14]
The information processing apparatus according to item 12, wherein the output control portion is configured to modify a parameter of the non-recognition notification information in accordance with a recognition score of an object of the recognition target.

[Item 15]
The information processing apparatus according to item 11, wherein the recognition processing portion is configured to identify a state or an attribute of the recognition target, and
the output control portion is configured to modify a parameter of the recognition notification information in accordance with the state or the attribute of the recognition target.

[Item 16]
The information processing apparatus according to item 13, wherein the state of the recognition target is a state related to at least one of a sense of vision, a sense of hearing, a sense of touch, a sense of smell, and a sense of taste of the recognition target.

[Item 17]
The information processing apparatus according to item 11, wherein the recognition processing portion is configured to calculate a degree of risk of the recognition target, and
the output control portion is configured to modify a parameter of the recognition notification information in accordance with the degree of risk.

[Item 18]
The information processing apparatus according to item 1, wherein the recognition processing portion is configured to perform, based on the captured image, the recognition processing with respect to a recognition target view angle that is a part of an angle of view of the captured image, and
when the recognition target is not recognized, the output control portion is configured to cause the output apparatus to output the non-recognition notification information in a direction corresponding to the part of the angle of view.

[Item 19]
An information processing method, including the steps of:
performing recognition processing of a recognition target based on a captured image of a surrounding environment of a mobile body; and
causing, when the recognition target is not recognized, an output apparatus to output non-recognition notification information indicating that the recognition target is not recognized.

[Item 20]
A computer program for causing a computer to execute the steps of:
performing recognition processing of a recognition target based on a captured image of a surrounding environment of a mobile body; and
causing, when the recognition target is not recognized, an output apparatus to output non-recognition notification information indicating that the recognition target is not recognized.

REFERENCE SIGNS LIST

101 Information processing apparatus
201 Imaging apparatus
301 Information output apparatus
11 Image acquiring portion
12 Recognition processing portion
13 Output control portion
14 Storage portion
21 Segmentation portion
22 Information output determining portion
23 Attribute determining portion
24 Risk degree calculating portion
31 Light-emitting apparatus
32 Audio output apparatus
33 Display apparatus
34 Vibration apparatus
35 Blower apparatus
36 Communication apparatus
51 Sensor data acquiring portion

The invention claimed is:
1. An information processing apparatus, comprising:
a recognition processing portion configured to:
perform a recognition processing operation of a recognition target, based on a captured image of a surrounding environment of a mobile body; and perform object detection based on the captured image; and an output control portion configured to:
cause an output apparatus to output non-recognition notification information, based on one of:
an object of the recognition target is not detected, or
the object of an unknown type is detected by the recognition processing portion; and
modify a first parameter of the non-recognition notification information based on a value of a recognition score of the object.

2. The information processing apparatus according to claim 1, wherein
the object of the unknown type is an object of which a recognition score is lower than a threshold.

3. The information processing apparatus according to claim 1, wherein
the recognition processing portion is further configured to identify a state of the recognition target represented by the object, and
the output control portion is further configured to cause the output apparatus to output the non-recognition notification information using a medium, wherein the medium is used based on a state of the recognition target.

4. The information processing apparatus according to claim 3, wherein
the medium includes at least one of light, sound, vibration, air, or radio waves.

5. The information processing apparatus according to claim 1, wherein
the recognition processing portion is further configured to identify a state of the recognition target represented by the object, and
the output control portion is further configured to modify a second parameter of the non-recognition notification information based on the state of the recognition target.

6. The information processing apparatus according to claim 5, wherein
the state of the recognition target includes at least one of a movement speed of the recognition target, a movement direction of the recognition target, or a distance from the mobile body.

7. The information processing apparatus according to claim 1, wherein
the recognition processing portion is further configured to calculate a degree of risk of the recognition target represented by the object, and
the output control portion is further configured to modify a third parameter of the non-recognition notification information based on the degree of risk.

8. The information processing apparatus according to claim 1, wherein
the output control portion is further configured to cause, when the recognition target is recognized, the output apparatus to output recognition notification information indicating that the recognition target is recognized.

9. The information processing apparatus according to claim 8, wherein
the output control portion is further configured to cause the output apparatus to output the recognition notification information when the object of the recognition target is detected.

10. The information processing apparatus according to claim 8, wherein
the recognition processing portion is further configured to identify one of a state or an attribute of the recognition target, and
the output control portion is further configured to cause the output apparatus to output the recognition notification information using a medium, wherein the medium is used based on one of the state or the attribute of the recognition target.

11. The information processing apparatus according to claim 9, wherein
the output control portion is further configured to modify a fourth parameter of the non-recognition notification information based on a recognition score of the object of the recognition target.

12. The information processing apparatus according to claim 8, wherein
the recognition processing portion is further configured to identify one of a state or an attribute of the recognition target, and
the output control portion is further configured to modify a fifth parameter of the recognition notification information based on one of the state or the attribute of the recognition target.

13. The information processing apparatus according to claim 10, wherein
the state of the recognition target is a state related to at least one of a sense of vision, a sense of hearing, a sense of touch, a sense of smell, or a sense of taste of the recognition target.

14. The information processing apparatus according to claim 8, wherein
the recognition processing portion is further configured to calculate a degree of risk of the recognition target, and
the output control portion is further configured to modify a sixth parameter of the recognition notification information based on the degree of risk.

15. The information processing apparatus according to claim 1, wherein
the recognition processing portion is further configured to perform, based on the captured image, the recognition processing operation with respect to a recognition target view angle that is a part of an angle of view of the captured image, and
when the recognition target is not recognized, the output control portion is further configured to cause the output apparatus to output the non-recognition notification information in a direction corresponding to the part of the angle of view of the captured image.

16. An information processing method, comprising:
performing recognition processing of a recognition target, based on a captured image of a surrounding environment of a mobile body;
performing object detection based on the captured image;
causing an output apparatus to output non-recognition notification information, based on one of:
an object of the recognition target is not detected, or
the object of an unknown type is detected by the object detection; and
modifying a parameter of the non-recognition notification information based on a value of a recognition score of the object.

17. A non-transitory computer-readable medium having stored thereon computer-executable instructions, that when executed by a processor of an information processing apparatus, cause the processor to execute operations, the operations, comprising:

performing recognition processing of a recognition target, based on a captured image of a surrounding environment of a mobile body;

performing object detection based on the captured image;

causing an output apparatus to output non-recognition notification information, based on one of:

an object of the recognition target is not detected, and the object of an unknown type is detected by the object detection; and modifying a parameter of the non-recognition notification information based on a value of a recognition score of the object.

18. An information processing apparatus, comprising:

a recognition processing portion configured to:

perform a recognition processing operation of a recognition target, based on a captured image of a surrounding environment of a mobile body;

perform, based on the captured image, the recognition processing operation with respect to a recognition target view angle that is a part of an angle of view of the captured image; and an output control portion configured to:

cause, when the recognition target is not recognized, an output apparatus to output non-recognition notification information, wherein the non-recognition notification information indicates that the recognition target is not recognized, and the non-recognition notification information is output in a direction corresponding to the part of the angle of view of the captured image.

* * * * *